United States Patent [19]
Hayashi

[11] Patent Number: 5,159,492
[45] Date of Patent: Oct. 27, 1992

[54] OBJECTIVE LENS SYSTEM FOR USE WITHIN MICROSCOPE

[75] Inventor: Takahisa Hayashi, Kyoto, Japan

[73] Assignee: Dainippoon Screen Mfg. Co., Ltd., Japan

[21] Appl. No.: 672,864

[22] Filed: Mar. 20, 1991

[30] Foreign Application Priority Data

Mar. 23, 1990 [JP] Japan .................. 2-74297
Apr. 24, 1990 [JP] Japan .................. 2-109849
Apr. 27, 1990 [JP] Japan .................. 2-112418

[51] Int. Cl.$^5$ ............................ G02B 21/02
[52] U.S. Cl. ..................... 359/661; 359/355; 359/659; 359/660
[58] Field of Search ............... 359/660, 661, 659, 355

[56] References Cited

U.S. PATENT DOCUMENTS 4,227,773 10/1980 Tojo et al. ................. 359/661

Primary Examiner—Scott J. Sugarman
Attorney, Agent, or Firm—Ostrolenk, Faber, Gerb & Soffen

[57] ABSTRACT

An objective lens system for use within a microscope includes a first to a fourth lenses which are spaced apart from an object side. The first lens is made of either quartz or fluorite, the second and the third lenses are made of quartz, while the fourth lens is made of fluorite. The system transmits ultraviolet and/or far ultraviolet light and correct chromatic aberration. The system is uncomplicated.

12 Claims, 17 Drawing Sheets

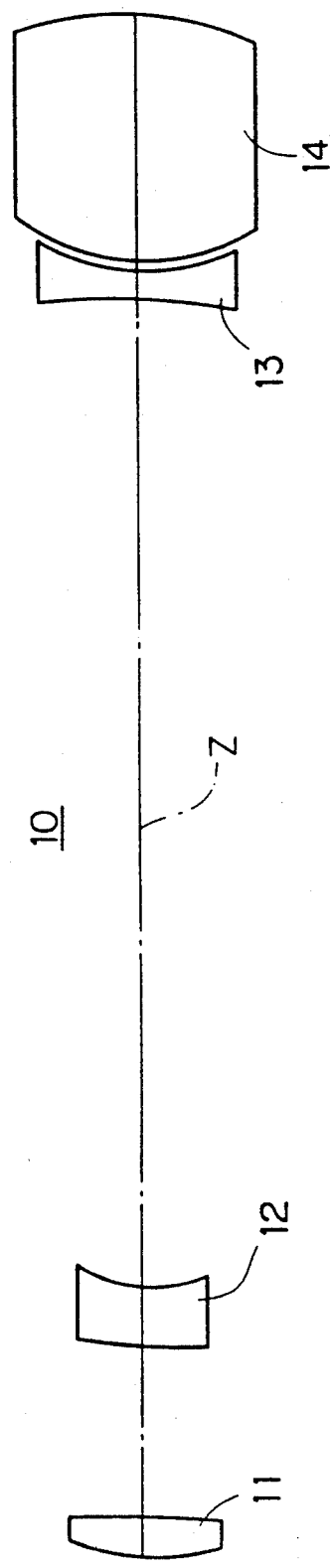
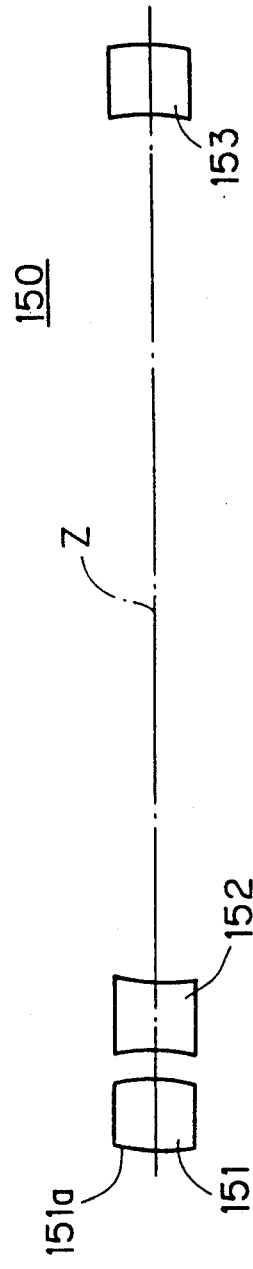

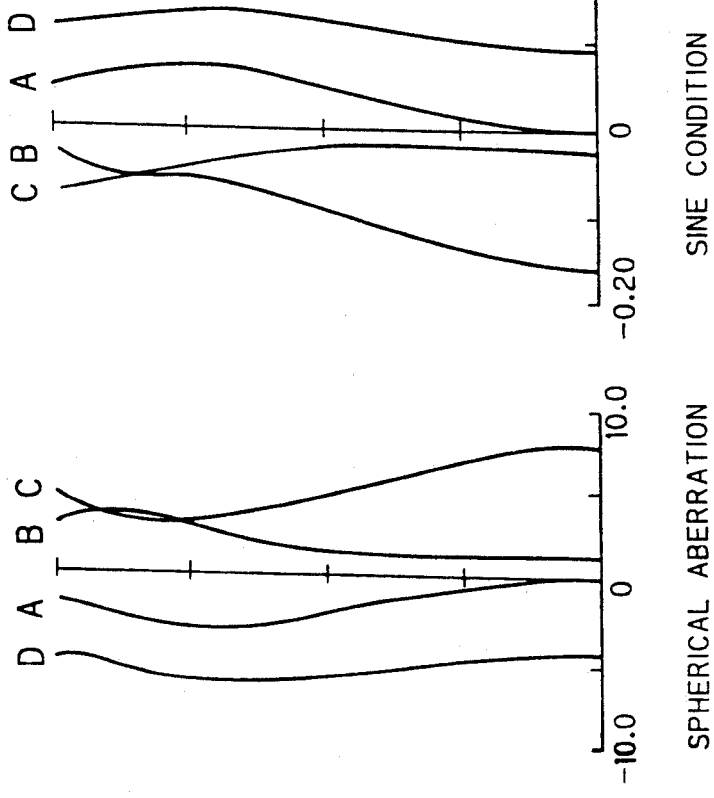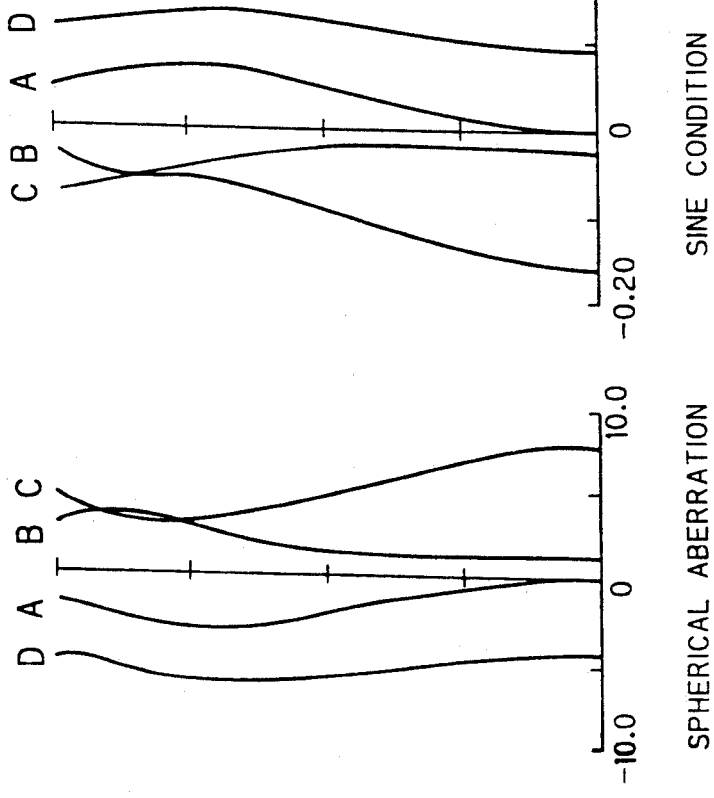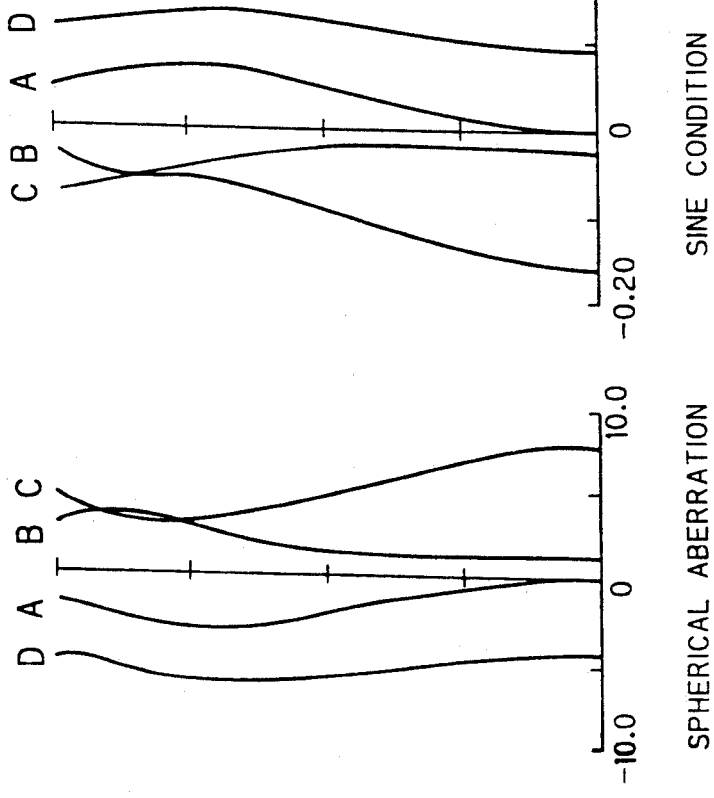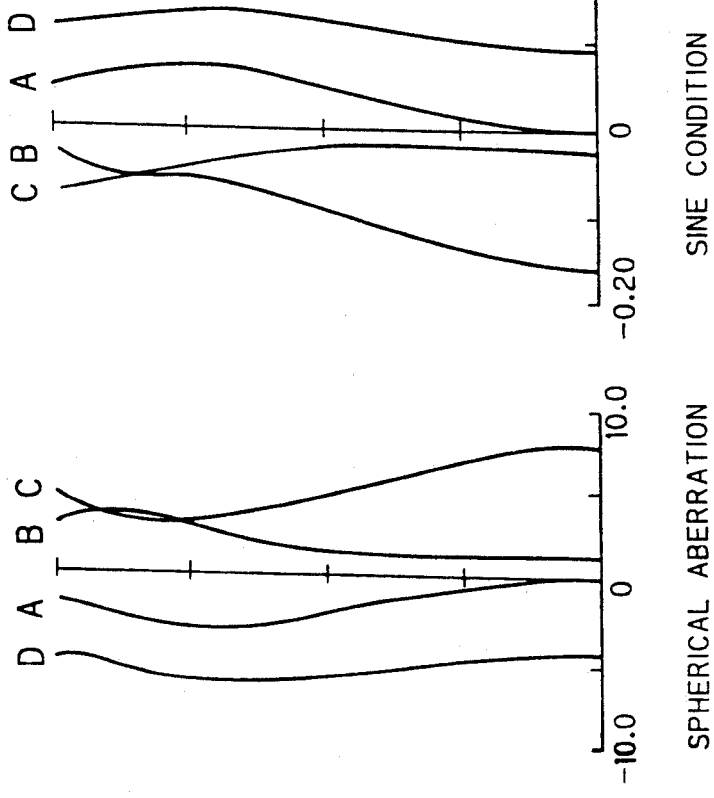

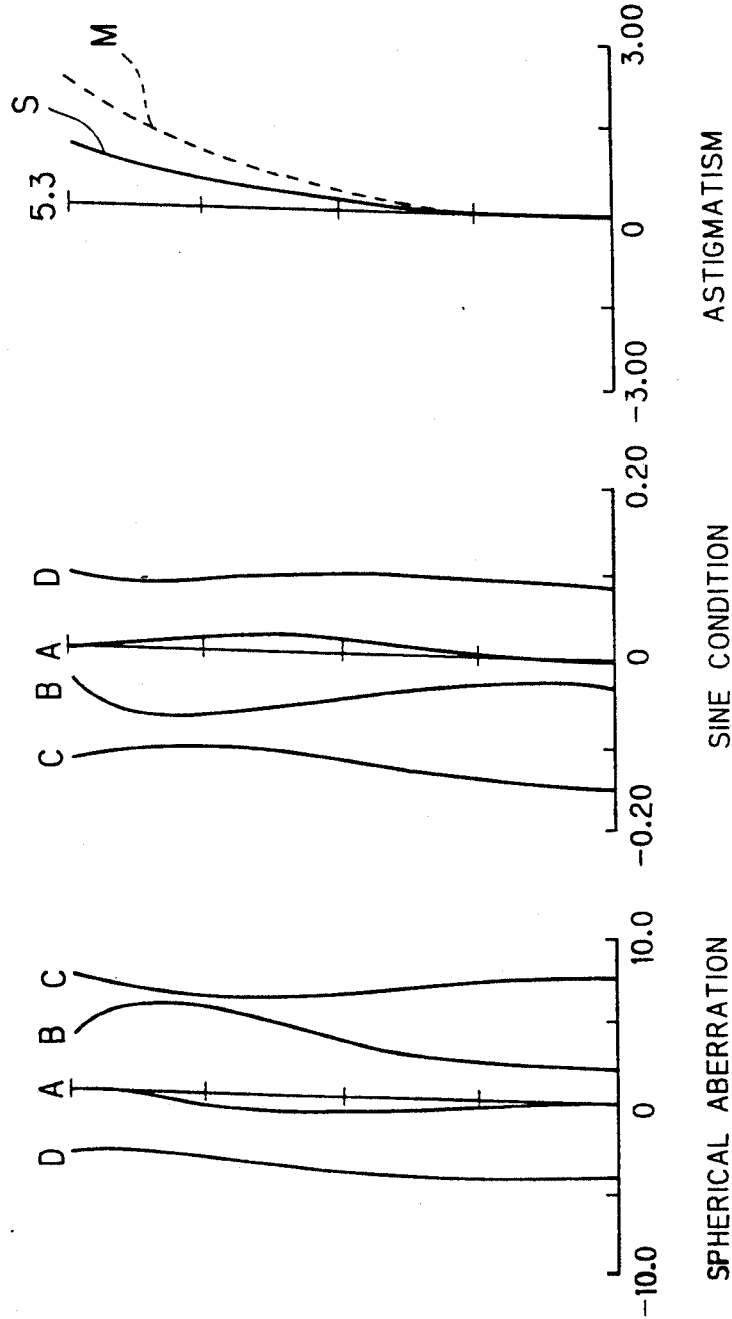

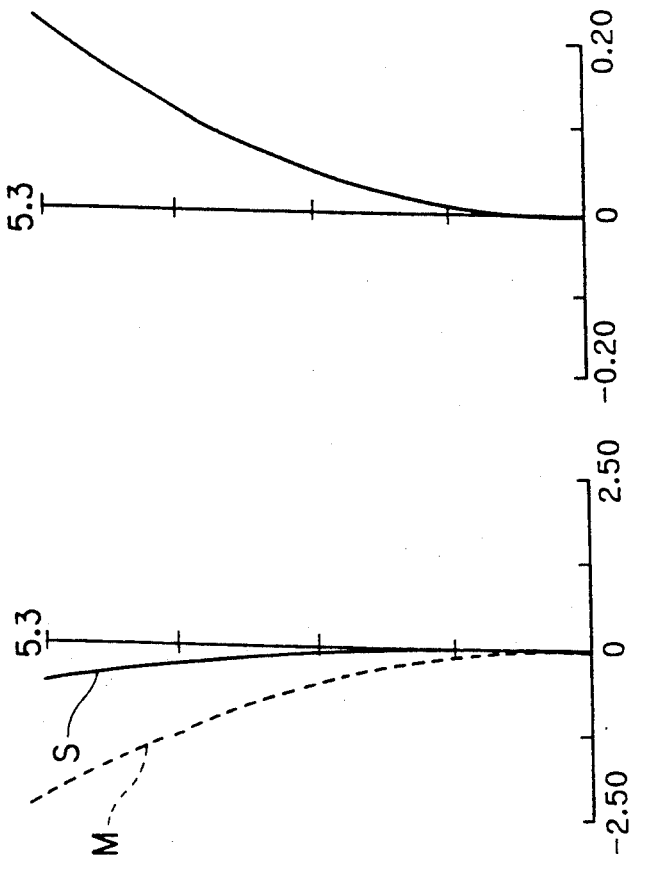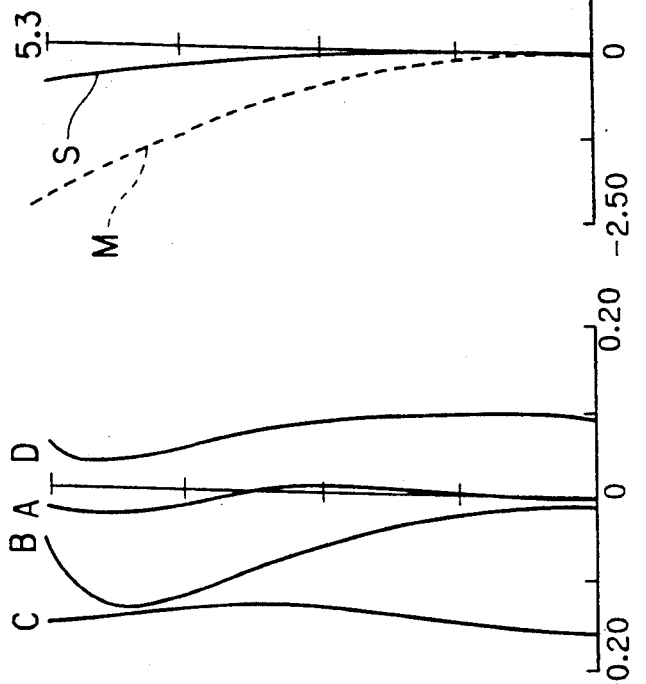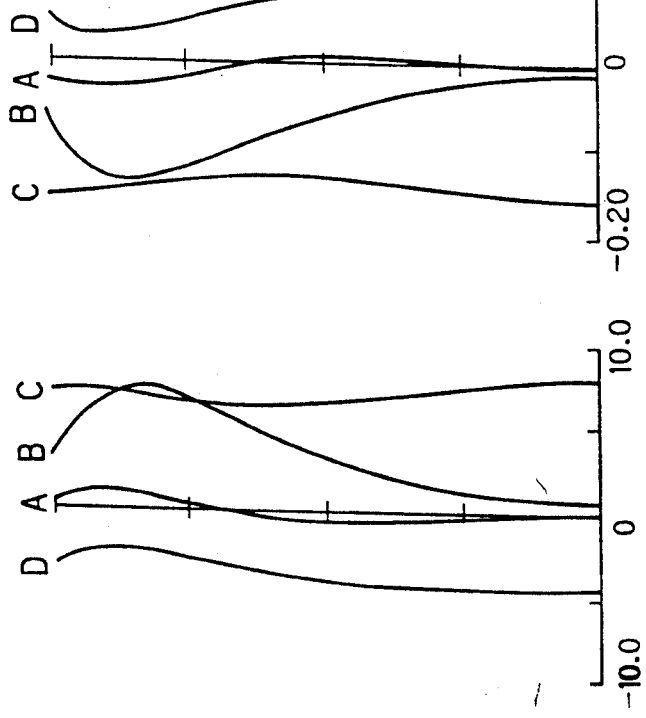

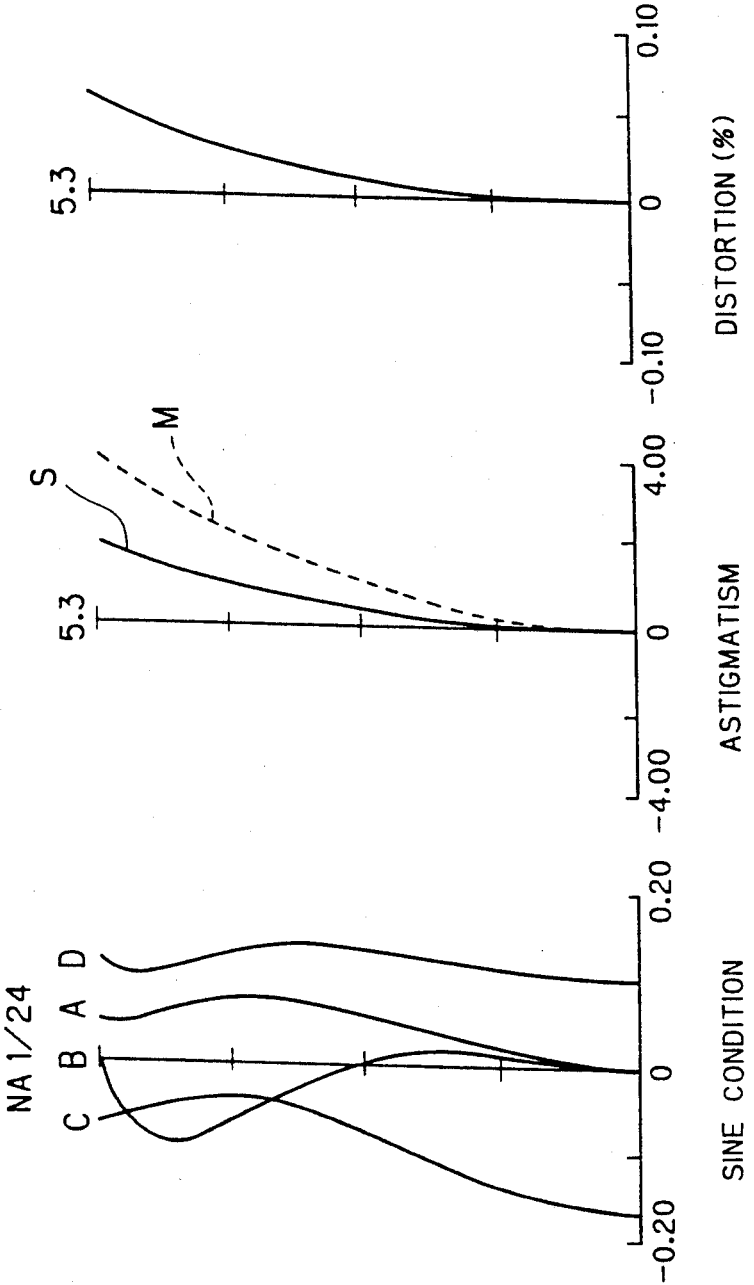

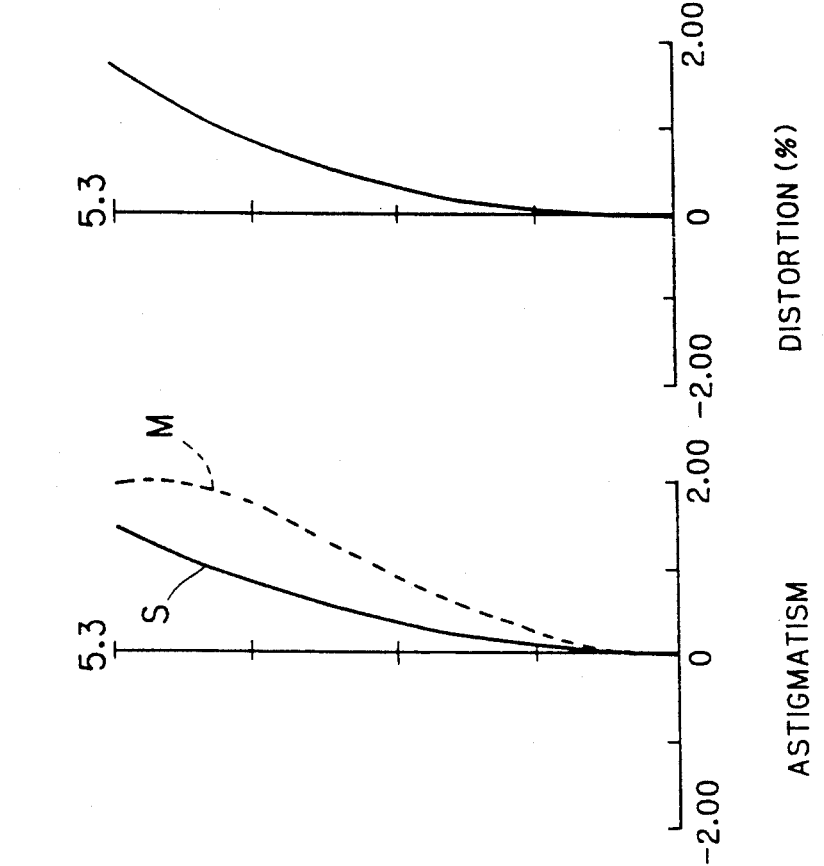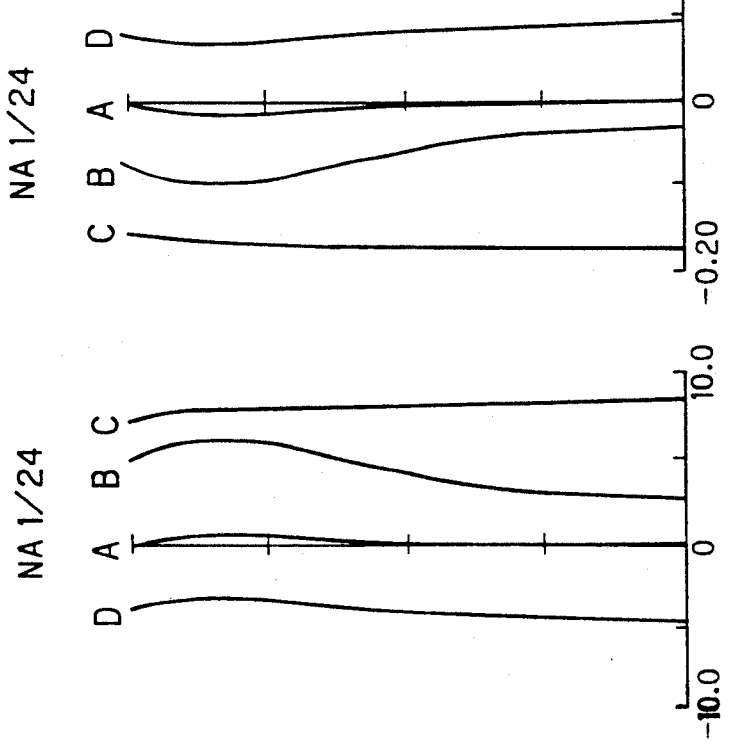

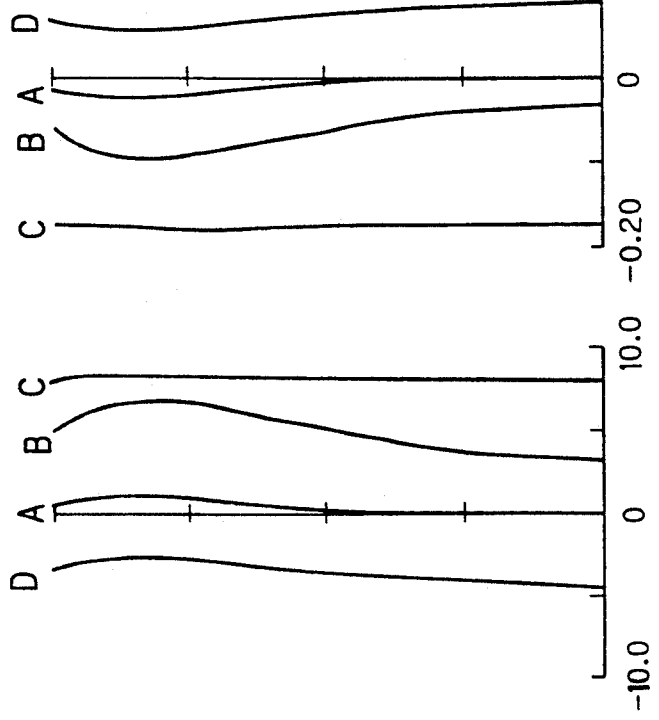
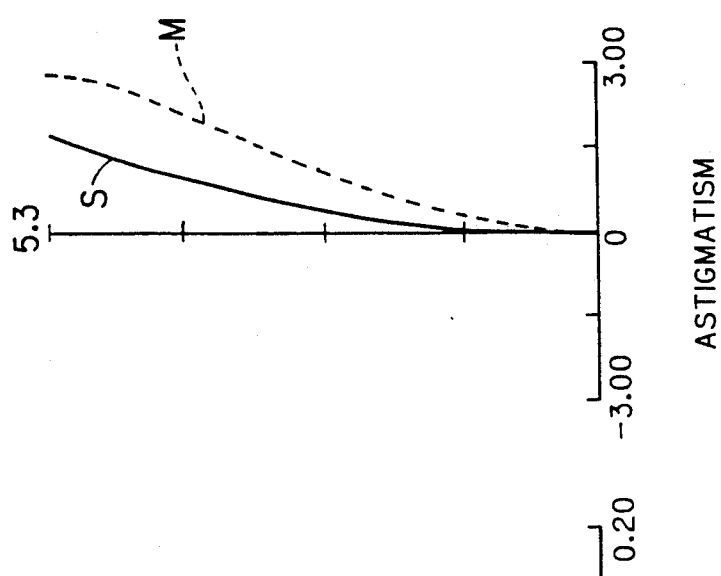
FIG. 15A  FIG. 15B  FIG. 15C  FIG. 15D

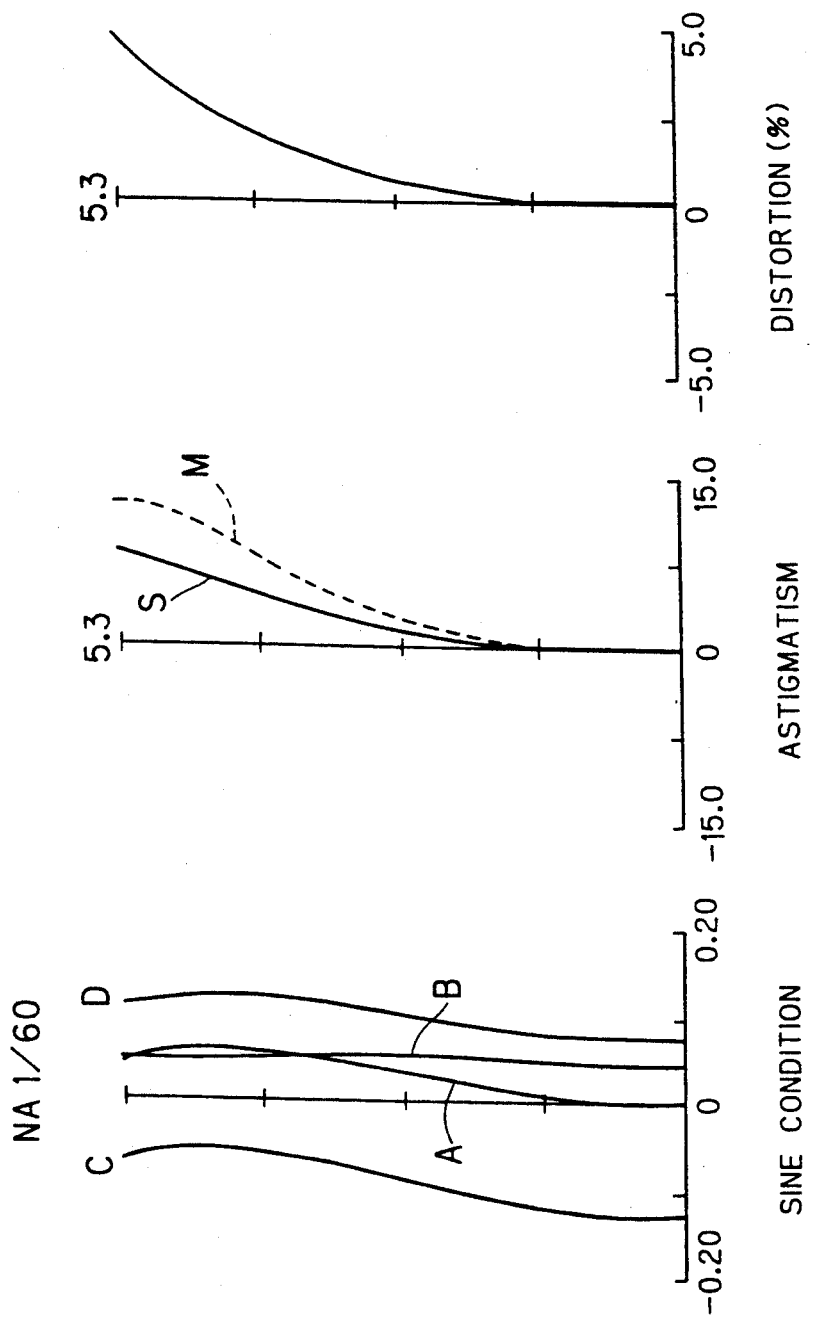

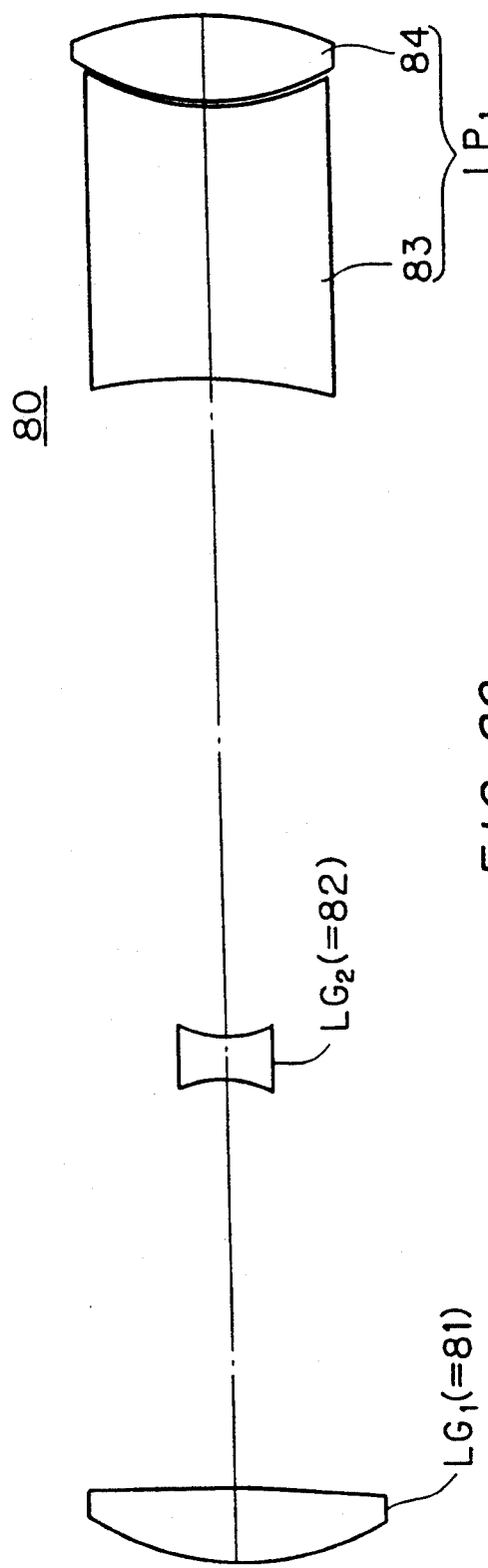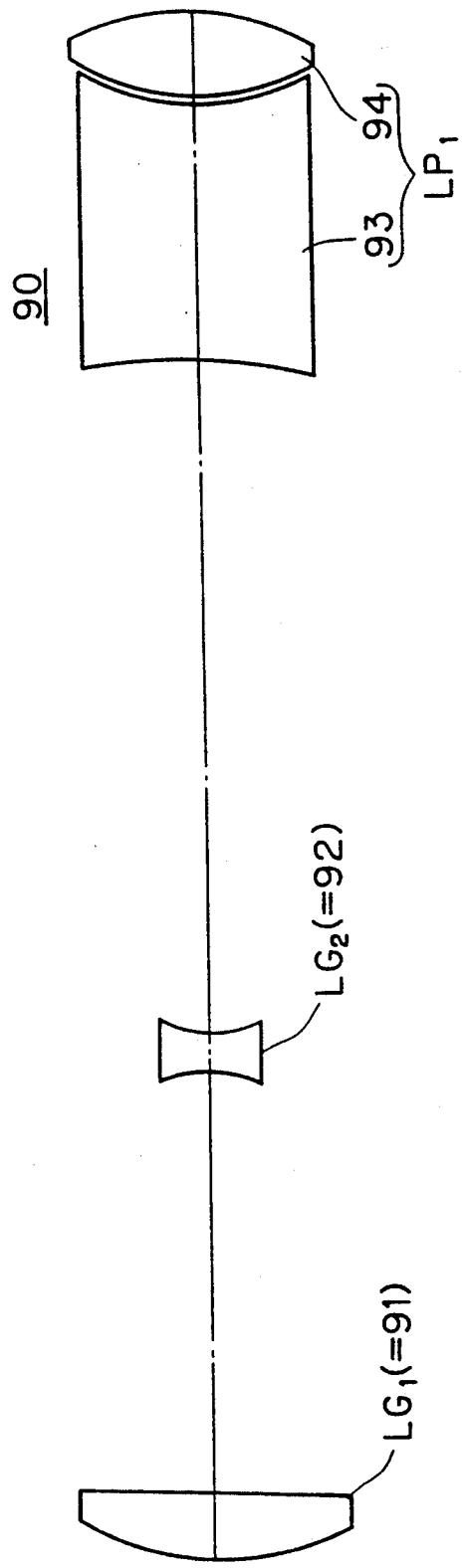

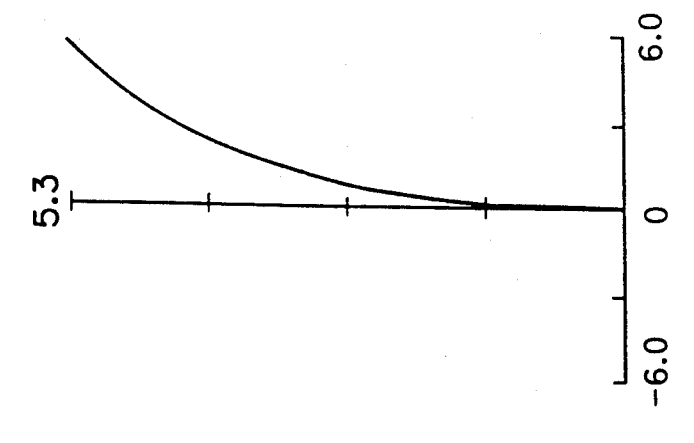
FIG. 19A  NA1/60
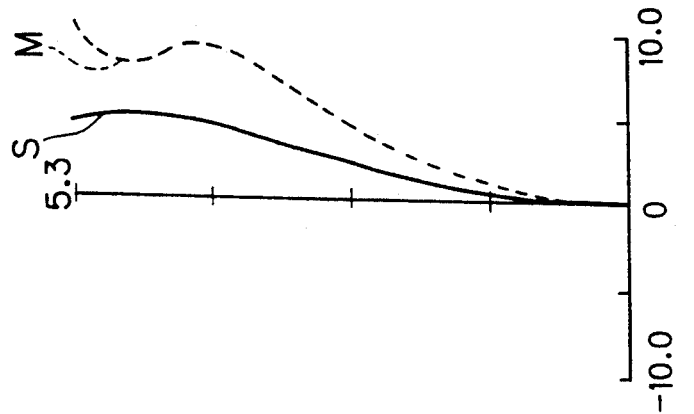
FIG. 19B  NA1/60
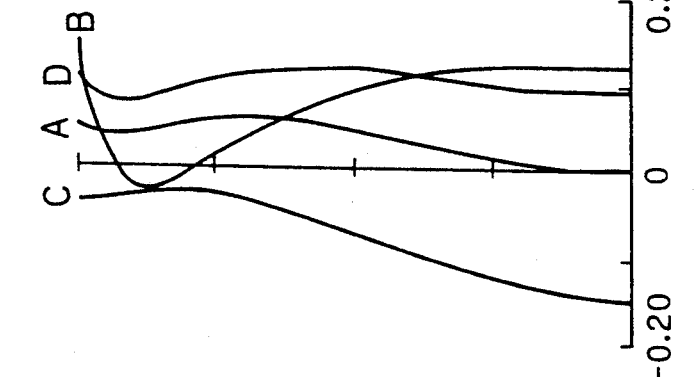
FIG. 19C
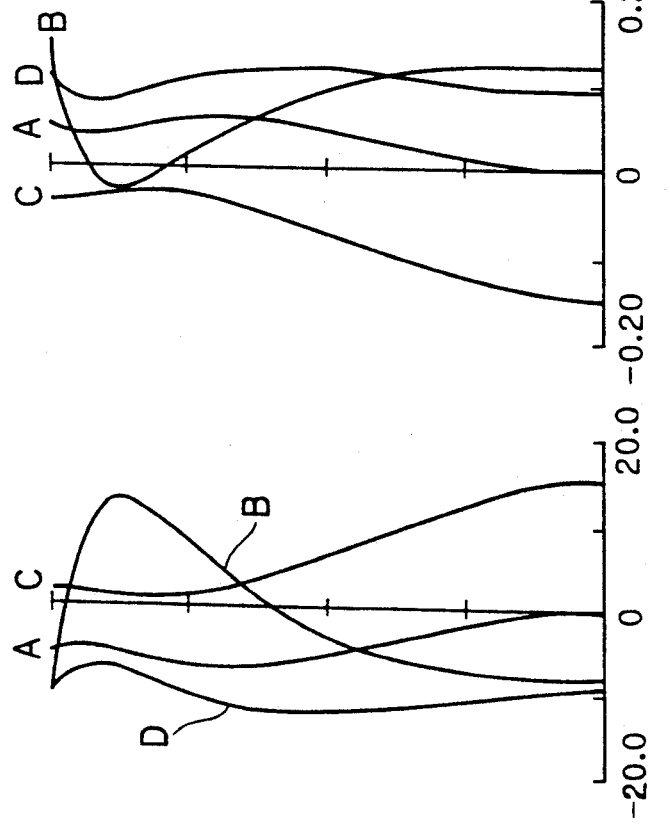
FIG. 19D

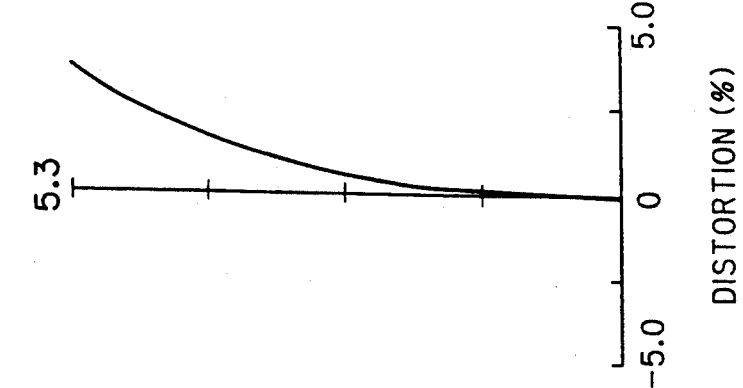
FIG.21A  FIG.21B
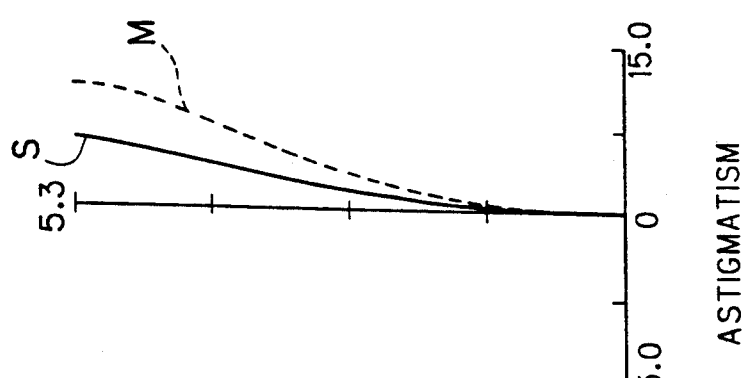
FIG.21C  FIG.21D
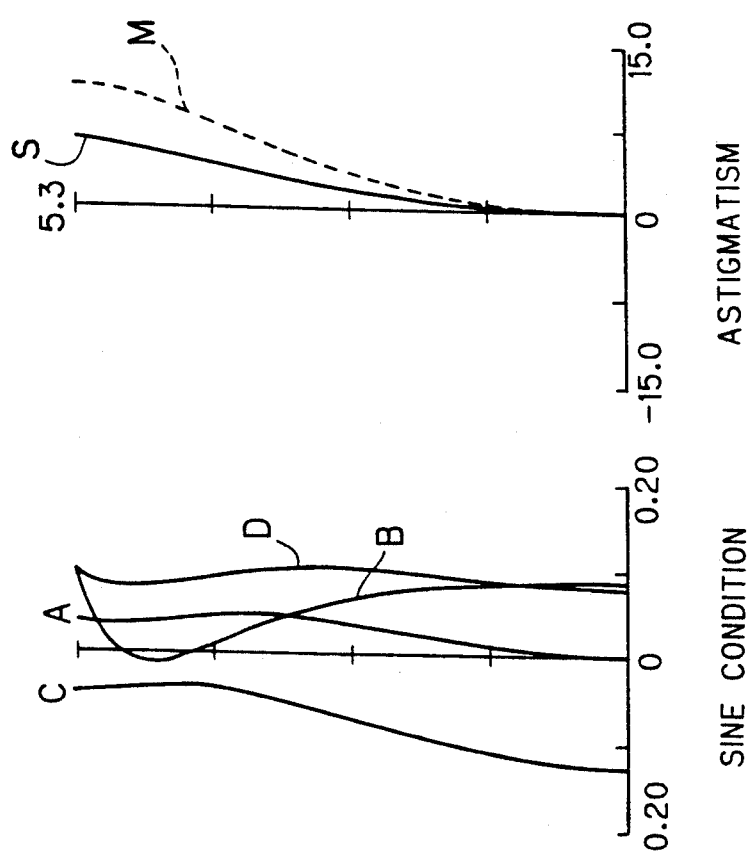
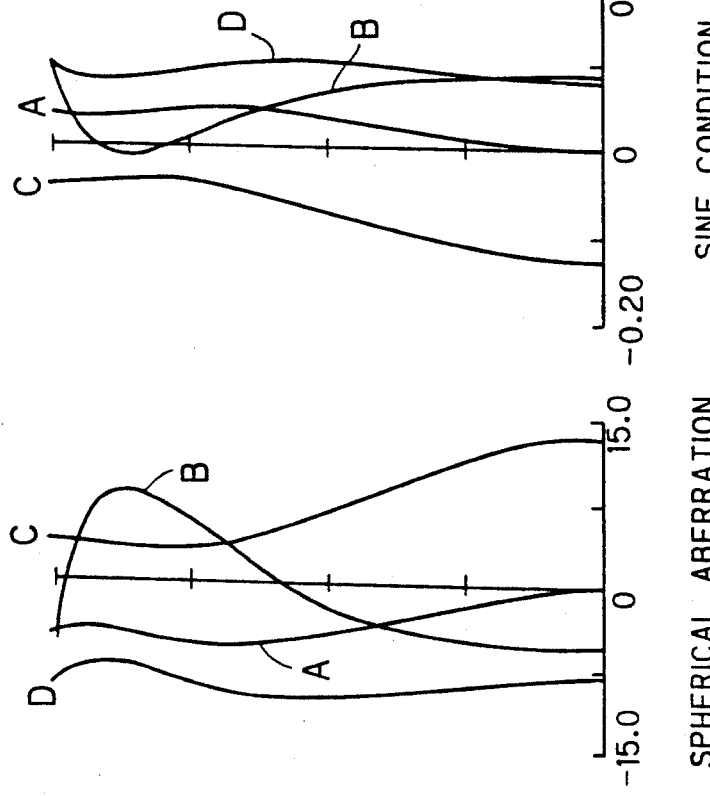

OBJECTIVE LENS SYSTEM FOR USE WITHIN MICROSCOPE

BACKGROUND OF THE INVENTION

1. Field of the Invention

The present invention relates to an objective lens system for use within a microscope which is employable in ultraviolet range, in particular, in the far ultraviolet range, where light has a wavelength shorter than 300 nm.

2. Description of the Background Art

It is commonly known in the art that a microscope has the property that, assuming a constant numerical aperture (NA) of the objective lens system within the microscope, the shorter is the wavelength of light used therein, and the better the resolution. Thus, it is possible to observe sample in greater detail by shortening the wavelength of the illumination light. In addition, illuminating a sample with ultraviolet light often results in fluorecence of a stronger intensity being discharged from the sample than obtained by illuminating with visible light. Therefore, a microscope employable in ultraviolet range is preferred in the art, because more information is obtained by observing a sample through such a microscope. Thus, the objective lens system for use in such a microscope must work in the ultraviolet and/or far ultraviolet range.

One of the known conventional objective lens systems which works in the ultraviolet and/or far ultraviolet range and usable as an objective lens system for use within a microscope is described in "Hikari Gijyutsu Contact," Volume 25, Number 2, Page 137 (Feb. 1987). That objective lens system is illustrated in FIG. 1.

In FIG. 1, an objective lens system 170 includes a first lens 171 made of fluorite, a second lens group 172 and a third lens group 173 disposed in that order from an object side (left-hand side of the figure) to an image formation side (right-hand side of the figure). The second lens group 172 includes two convex lenses 172b and 172c both made of fluorite and a concave lens 172a made of quartz. The second lens group 172 is formed by holding the concave lens 172a between the convex lenses 172b and 172c and joining the same to each other. The third lens group 173 is formed, in a similar manner to the second lens group 172, by holding a concave lens 173a made of quartz between two convex lenses 173b and 173c both made of fluorite and joining the same to each other.

Since the lenses 171, 172a to 172c and 173a to 173c are made of either quartz or fluorite, the objective lens system 170 is capable of transmitting and is usable in the ultraviolet and/or far ultraviolet range.

In addition, chromatic aberration can be corrected in the objective lens system 170, since the second lens group 172 is composed of the concave lens 172a made of quartz and the convex lenses 172b and 172c made of fluorite while the third lens group 173 is composed of the concave lens 173a made of quartz and the convex lenses 173b and 173c made of fluorite.

The convex lens 172b, the concave lens 172a and the convex lens 172c of the second lens group 172 are brought into optical contact and joined to each other. Similarly in the third lens group 173, the convex lens 173b, the concave lens 173a and the convex lens 173c are brought into optical contact and are thereby joined to each other. This is attributable to the current technical level that has not been able to provide adhesive which transmits far ultraviolet light. Further, when the junction (contacting) surface between lenses has to completely eliminate reflection thereat, there is no option other than to cement by optical contact. Thus, in the process of manufacturing the objective lens system 170, junction surfaces must be finished with extremely high accuracy, which result in much higher costs.

The inventor herein has already suggested an objective lens system for use within a microscope in which the aforementioned problem is solved. See Japanese Patent Laid-Open Gazette Nos. 1-319719 and 1-319720, referred to below as the "prior applications." FIG. 2 shows an objective lens system for use within a microscope, namely, objective lens system 160, according to an embodiment of the prior applications. The suggested objective 160 includes lenses 161 to 163, which are made of either quartz or fluorite. The lenses 161 to 163, i.e., a first to a third lenses, are displaced in that order from an object side (left-hand side in the figure) to an image formation side (right-hand side in the figure) with preselected air spaces therebetween. This enables the objective lens system 160 to be used in both the ultraviolet and far ultraviolet range. The lenses 161 to 163, as has just been mentioned, are separated from each other; that is, the objective lens system 160 includes no junction surfaces. The objective lens system 160 is therefore free from the high manufacturing cost problem.

The objective lens system 160 cooperates with an image formation lens system (described later) in order to form an image of an object to be observed on the focal plane of the image formation lens system at a predetermined imaging magnification M. The imaging magnification M is a ratio of the focal length $f_2$ of the image formation lens system to the focal length $f_1$ of the objective lens system 160, and is given as:

$$M = -f_2/f_1 \qquad (1)$$

In general, one changes the objective lens system while retaining the image formation lens. The imaging magnification M is thereby changed. Objective lens systems for replacement are necessary for this end, each of the lens systems having a focal length different from the focal length $f_1$.

According to equation (1), a replacement objective lens system which has a focal length of $2 \cdot f_1$ is necessary in order to halve the original imaging magnification M. If what is required here is nothing more than to form the replacement objective lens system such that its focal length is $2 \cdot f_1$, the required objective lens system merely has to have a size of a proportionally enlarged version of the objective lens system 160.

However, if the objective lens system 160 is replaced with the required objective lens system for replacement mentioned above (which is equal to the objective lens system 160 doubled in terms of size), the distance between the required objective lens system for replacement and the object to be observed would also have to be doubled as long as the pupil of the microscope is fixed. This is extremely time-consuming as well as labor-consuming in that the microscope must be brought into focus once again all from the beginning after the replacement, enormously adversely impacting the operation of the microscope. In addition, such replacement causes doubling of the pupil size, which in turn causes a remarkable change in the quantity of light illumination the object. On the other hand, if the position of the object is fixed, the position of the pupil has to be moved. This should also be avoided in an illumination system for illuminating the object, since positional changes of the pupil exerts unfavorable effect upon the illumination conditions.

Thus, when imaging magnification is to be halved by replacing the objective lens system, the replacement objective lens system must have:

(a) a focal length double that of the objective lens system 160;

(b) parfocality; that is, the property that it eliminates the necessity of bringing the microscope into focus once again after the lens replacement; and (c) a pupil of roughly the same as that of the objective lens system 160.

The equation (1) also shows that an replacement objective lens system with a focal length of $5 \cdot f_1$ is necessary to observe an object at an imaging magnification of M/5. Thus, in the case of obtaining an image of the object under a microscope at M/5 power, the replacement objective lens system must have:

(a) a focal length five times larger than that of the objective lens system 160;

(b) parfocality; that is, the property of eliminating needing to bring the microscope into focus once again after lens replacement; and (c) a pupil which is roughly the same in size as that of the objective lens system 160.

SUMMARY OF THE INVENTION

The present invention is directed to an objective lens system for use within a microscope. The system includes: a first lens made of either quartz or fluorite, the first lens having a positive power; a second and a third lenses made of quartz, both the second and third lenses having a negative power; and a fourth lens made of fluorite, the fourth lens having a positive power, wherein the first to the fourth lenses are disposed in that order from an object side to an image formation side with predetermined air spacings therebetween.

The present invention is also directed to an objective system. The system includes: a first lens meniscus lens made of either quartz or fluorite, the first lens having a positive power, the first lens having a convex surface directed toward an object; a second lens made of quartz, the second lens having a negative power; and a third lens made of fluorite, the third lens having a positive power, wherein the first to the third lenses are disposed in that order from an object side to an image formation side with predetermined air spacings therebetween.

The present invention is also directed to an objective lens system. The system includes: a first lens group including a lens made of either quartz or fluorite, the lens having a positive power; a second lens group including a lens made of quartz, the lens having a negative power; and a third lens group including a lens pair, the lens pair comprising a lens having a positive power and a lens having a negative power, the positive lens made of fluorite, the negative lens made of quartz, the positive and negative lenses being separated from each other, wherein the first to third lens groups are disposed in that order from an object side to an image formation side with predetermined air spacings therebetween.

The present invention also relates to an apparatus for measuring the thickness of a film on a sample, the apparatus including: means for illuminating a sample, and a microscopic optical system for imaging ultraviolet and-/or far ultraviolet light reflected from the sample, the microscopic optical system including an objective lens system for converging the light in an image formation direction.

An object of the present invention is to provide an inexpensive objective lens system for use within a microscope which is usable in the ultraviolet and/or far ultraviolet range and which is different in structure from the objective lens system according to the prior applications.

Another object of the present invention is to provide an objective lens system for use within a microscope which has a focal length approximately one half of, parfocality, and a pupil roughly the same as the corresponding parameters of the objective lens system of the prior applications which forms an image on an image plane of an image formation lens system at a predetermined imaging magnification when cooperates with the image formation lens system.

Another object of the present invention is to provide an apparatus which uses ultraviolet and/or far ultraviolet light to accurately measure the thickness of a film which is formed on a sample.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 3, 6, 8 and are a block diagrams of an objective lens system according to a first embodiment of the present invention;

FIG. 4 is a block diagram of an image formation lens system;

FIGS. 5A, 5B, 5C and 5D illustrate spherical aberration, sine condition, astigmatism and distortion of an optical system utilizing the image formation lens system of FIG. 4 and the objective lens system of FIG. 3, respectively;

FIGS. 7A, 7B, 7C and 7D illustrate spherical aberration, sine condition, astigmatism and distortion of an optical system utilizing the image formation lens system of FIG. 4 and the objective lens system of FIG. 6, respectively;

FIGS. 9A, 9B, 9C and 9D illustrate spherical aberration, sine condition, astigmatism and distortion of an optical system utilizing the image formation lens system of FIG. 4 and the objective lens system of FIG. 8, respectively;

FIGS. 11A, 11B, 11C and 11D illustrate spherical aberration, sine condition, astigmatism and distortion of an optical system utilizing the image formation lens system of FIG. 4 and the objective lens system of FIG. 10, respectively;

FIGS. 13A, 13B, 13C and 13D illustrate spherical aberration, sine condition, astigmatism and distortion of an optical system utilizing the image formation lens system of FIG. 4 and the objective lens system of FIG. 12, respectively;

FIGS. 15A, 15B, 15C and 15D illustrate spherical aberration, sine condition, astigmatism and distortion of an optical system utilizing the image formation lens system of FIG. 4 and the objective lens system of FIG. 14, respectively;

FIGS. 16, 18 and 20 are block diagrams of an objective lens system according to a third embodiment of the present invention., FIGS. 17A, 17B, 17C and 17D illustrate spherical aberration, sine condition, astigmatism and distortion of an optical system utilizing the image formation lens system of FIG. 4 and the objective lens system of FIG. 16, respectively;

FIGS. 19A, 19B, 19C and 19D illustrate spherical aberration, sine condition, astigmatism and distortion of an optical system utilizing the image formation lens system of FIG. 4 and the objective lens system of FIG. 18, respectively;

FIGS. 21A, 21B, 21C and 21D illustrate spherical aberration, sine condition, astigmatism and distortion of an optical system utilizing the image formation lens system of FIG. 4 and the objective lens system of FIG. 20, respectively;

DESCRIPTION OF THE PREFERRED EMBODIMENTS

A. First Embodiment

Figure 1:
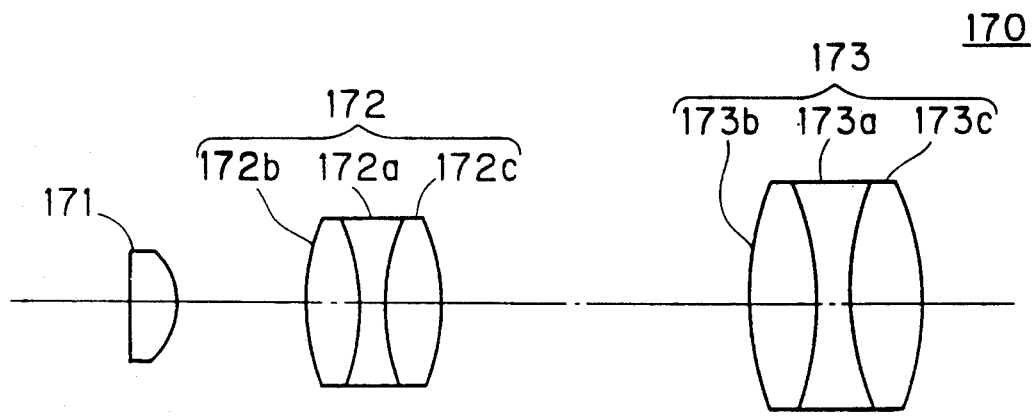
FIGS. 1 and 2 are a block diagram of a conventional objective lens system for use within a microscope.

An objective lens system according to a first embodiment of the present invention includes a first to a fourth lenses disposed in that order from an object side to an image formation side with predetermined air spacings therebetween. The first lens is made of either quartz or fluorite, and has a positive power. The second and the third lenses are made of quartz, and have a negative power. The fourth lens is made of fluorite, and has a positive power. This enables the objective lens system to transmit ultraviolet and/or far ultraviolet light, and hence to be employed tn ultraviolet and/or far ultraviolet range.

In addition to this, the first to the fourth lenses are separated from each other by a predetermined air space; that is, the objective lens system needs no optical contact. This provides a large reduction in cost for the objective lens system.

Further, the first and the fourth lenses have a positive power, whereas the second and the third lenses have a negative power. This enables correction of aberrations such as spherical and chromatic aberrations.

Aberrations can be further moderated especially when the objective lens system satisfies the following relationships:

$$0.54 < |\phi_1/\phi_2| < 0.75 \quad (2)$$

$$0.90 < |\phi_4/\phi_3| < 0.95 \quad (3)$$

where $\phi_1$, $\phi_2$, $\phi_3$ and $\phi_4$ are the powers of the first to the fourth lenses, respectively.

This is firstly because aberrations are excessively corrected (i.e., overcorrected) when an absolute value $|\phi_1/\phi_2|$ is not more than 0.54, whereas aberrations can not be inadequately corrected (i.e., undercorrected) when the value is less than 0.75.

Further, when the absolute value $|\phi_4/\phi_3|$ is not more than 0.9, aberrations are excessively corrected (i.e., overcorrected), whereas aberrations are inadequately corrected (undercorrected) when the value is less 0.95.

The objective lens system according to the first embodiment is interchangeable with other objective lens systems, according to the prior applications, for forming an image by cooperating with an image formation lens system. In the objective lens system of the first embodiment, the third lens having the negative power and the fourth lens having the positive power are provided, resulting in correction for chromatic aberration. The second lens has the large negative power, so that the objective lens system is a so-called telephoto type lens system. Thus, the focal length of the objective lens system grows larger compared to a total length thereof.

The first lens has the positive power, allowing the objective lens system to have a telecentric characteristic on the object side.

The composite lens system consisting of the second to the fourth lenses has a large focal length and functions as a teleconverter for the first lens. That is, the composite lens system magnifies the focal length of the first lens so a to adjust the focal length of the objective lens system to a desired value.

For satisfying this condition accurately, the following equation must be satisfied:

$$|\phi_1/\phi| = |\phi_2/\phi_{34}| \quad (4)$$

where $\phi$ is a power of the entire system. In practice, however, the composite lens system need not be a complete afocal system, but is only required to satisfy the following inequalities (5A) and (5B):

$$0.92(\phi_1/\phi) < |\phi_2/\phi_{34}| \quad (5A)$$

$$1.07(\phi_1/\phi) > |\phi_2/\phi_{34}| \quad (5B)$$

As above-mentioned, the correction of the chromatic aberration is carried out by the combination of the third and fourth lenses. In the case where the image of the object is formed through the third and the fourth lenses, the value $|\phi_4/\phi_3|$ is preferably set within the range of 1.3 to 1.4 in consideration of the dispersion of fluorite and quartz. When the objective lens system includes the first to the fourth lenses, however, it is rather preferable to design the objective lens system so that a composite lens system consisting of the third and the fourth lenses over corrects the aberration, the reason being for correcting the aberration caused by the first and second lenses. Hence, it is preferable to set the value $|\phi_4/\phi_3|$ within the range of 0.90 to 0.95; that is, to set the objective lens system to satisfy the inequality (3).

Furthermore, in order to give parfocality to the objective lens system of the first embodiment, the following inequality must be satisfied:

$$0.60 \cdot |(4\phi/3\phi_1 - 1)/\phi_1| < |1/\phi_2| \quad (6A)$$

$$1.1 \cdot |(4\phi/3\phi_1 - 1)/\phi_1| > |1/\phi_2| \quad (6B)$$

In the present invention supposed in the case where the focal point of the objective lens system on the image side is located substantially in the composite lens system consisting of the third and the fourth lenses, and where the parfocal length of the objective lens system is $\frac{4}{3}$ times larger than the focal length thereof. Assuming that the interval between the principal points of a composite lens system, consisting of the second to the fourth lenses, is indicated by e, the condition represented by the following expression can be obtained:

$$e + 1/\phi_1 \approx \frac{3}{2}(1/\phi) \quad (7)$$

For providing an objective lens system with the telecentric characteristic on the object side, the pupil of the composite lens system consisting of the second to the fourth lenses must be provided at the focal point of the first lens. Accordingly, the condition represented by the following expression can be obtained:

$$e(1 + 1/(1 + \phi_2 \cdot e)) \approx \frac{3}{2}(1/\phi) - 2/\phi_1 \quad (8)$$

When the conditions (7) and (8) are taken into consideration, the objective lens system is required to satisfy the inequalities (6A) and (6B).

A-1. First Example

FIG. 3 is a block diagram of an objective lens system according to preferred example of the first embodiment. In FIG. 3, an objective lens system 10 includes a first to a fourth lenses 11 to 14. The lenses 11 to 14 are serially arranged in that order from an object side (left-hand side of the figure) to an image side (right-hand side of the figure) with predetermined air spaces therebetween. The first and the fourth lenses and 14 have a positive power, whereas the second and the third lenses 12 and 13 have a negative power.

The following table 1 shows lens data of the objective lens system 10:

TABLE 1

| i | radius of curvature $r_i$ | surface-to-surface distance $d_i$ | material |
|---|---|---|---|
| 1 | 6.182 | 0.90 | quartz |
| 2 | −563.227 | 4.00 | |
| 3 | 27.300 | 1.45 | quartz |
| 4 | 3.755 | 22.95 | |
| 5 | −14.539 | 0.70 | quartz |
| 6 | 5.286 | 0.23 | |
| 7 | 5.786 | 5.70 | fluorite |
| 8 | −8.000 | | |

In table 1, the symbol $r_i$ represents radius of curvature of an i-th lens surface from the object side (left-hand side in the figure), and the symbol $d_i$ represents a distance between an i-th lens surface and an (i+1)-th lens surface along an optical axis Z, where the subscript i is an integer from one to eight. These symbols adhere to Tables 3 to 5 appearing later as well. As will be understood from the Table 1, the first to the third lenses 11 to 13 are all made of quartz, while the fourth lens is made of fluorite.

The focal length f of the objective lens system 10 is 60, the numerical aperture (NA) thereof is 1/24, and the image size thereof is 10.6.

With respect to the wavelength of 298.06 (nm), the powers $\phi_1$, $\phi_2$, $\phi_3$ and $\phi_4$ of the first to the fourth lenses 11 to 14, the power $\phi_{34}$ of the composite lens system consisting of the third lens 13 and the fourth lens 14, and the power $\phi$ of the entire system (the objective lens system 10) are as follows:

| | | | |
|---|---|---|---|
| $\phi_1 =$ | 0.0798 | $\phi_2 =$ | −0.1099 |
| $\phi_3 =$ | −0.1016 | $\phi_4 =$ | 0.1179 |
| $\phi_{34} =$ | 0.0241 | $\phi =$ | 0.0167 |

Thus, $$|\phi_1/\phi_2| = 0.726$$

$$|\phi_4/\phi_3| = 0.925$$

It is obvious that the objective lens system 10 satisfies the inequalities (2) and (3).

Further, $$0.92(\phi_1/\phi) = 4.406$$

$$1.07(\phi_1/\phi) = 5.125$$

$$|\phi_2/\phi_{34}| = 4.561$$

It is also obvious that the objective lens system 10 satisfies the inequalities (5A) and (5B).

In addition, $$|1/\phi_2| = 9.099$$

$$0.60 \cdot |(4\phi/3\phi_1 - 1)/\phi_1| = 5.424$$

$$1.1 \cdot |(4\phi/3\phi_1 - 1)/\phi_1| = 9.944$$

It is also obvious that the objective lens system satisfies the inequalities (6A) and (6B).

The objective lens system 10 is designed as a so-called infinity corrected objective system so as to be usable a reflecting type microscope. That is, the objective lens system 10, when used in combination with an image formation lens system, forms an image of an object on the focal plane of the image formation lens system. The image formation lens system is described in the following:

FIG. 4 is a block diagram of the image formation lens system, the image formation lens system being identical to the one disclosed in the prior applications, namely, Japanese Patent Laid-Open Gazette Nos. 1-319719 and 1-319720. In FIG. 4, an image formation lens system 150 includes first to third lenses 151 to 153. The first, the second and the third lenses 151, 152 and 153 are displaced in that order from an object side (left-hand side of the figure) to an image formation side (right-hand side of the figure) with predetermined air spaces therebetween.

Table 2 below shows data of the image formation lens system 150.

TABLE 2

| i | radius of curvature $R_i$ | surface-to-surface distance $D_i$ | material |
|---|---|---|---|
| 1 | 23.000 | 7.00 | fluorite |
| 2 | −31.540 | 2.75 | |
| 3 | −23.180 | 7.00 | quartz |
| 4 | 33.710 | 86.40 | |
| 5 | −10.530 | 7.00 | quartz |
| 6 | −13.488 | | |

In Table 2, the symbol $R_i$ represents radius of curvature of an i-th lens surface from the object side (left-hand side in the figure), and the symbol $D_i$ represents a distance between the i-th lens surface and an (i+1)-th lens surface along an optical axis Z. As will be understood from the Table 2, the first lens 151 is made of fluorite, the second and the third lenses 152 and 153 are both made of quartz. The focal length f' of the image formation lens system 150 is 300.

Hence, the equation below gives the imaging magnification M of a microscope utilizing the image formation lens system 150 and the objective lens system 10.

$$M = -f'/f = -300/60 = -5.00$$

FIGS. 5A and 5B illustrate, respectively spherical aberration and sine condition in the optical system formed by the image formation lens system 150 and the objective lens system 10. In FIGS. 5A and 5B (and also in FIGS. 7A, 7B, 9A, 9B, 11A, 11B, 13A, 13B, 15A, 15B, 17A, 17B, 19A, 19B, 21A and 21B: provided later), alphabetic characters A, B, C and D show a value with respect to light wavelengths of 298.06 nm, 202.54 nm, 398.84 nm and 253.70 nm, respectively.

FIGS. 5C and 5D illustrate, respectively astigmatism and distortion at light of a wavelength of 298.06 nm. In FIG. 5C (and in FIGS. 7C, 9C, 11C, 13C, 15C, 17C, 19C and 21C), the solid line S relates to the sagittal image field while the broken line M to the meridional image field.

FIGS. 5A and 5B clearly show that the objective lens system 10 successfully restrains aberrations at ultraviolet and far ultraviolet light. Thus, the objective lens system 10 is employable in ultraviolet and far ultraviolet range. In addition, FIGS. 5C and 5D show that serious astigmatism and distortion do not occur in the optical system utilizing the objective lens system 10.

A-2. Second Example

Figure 6:
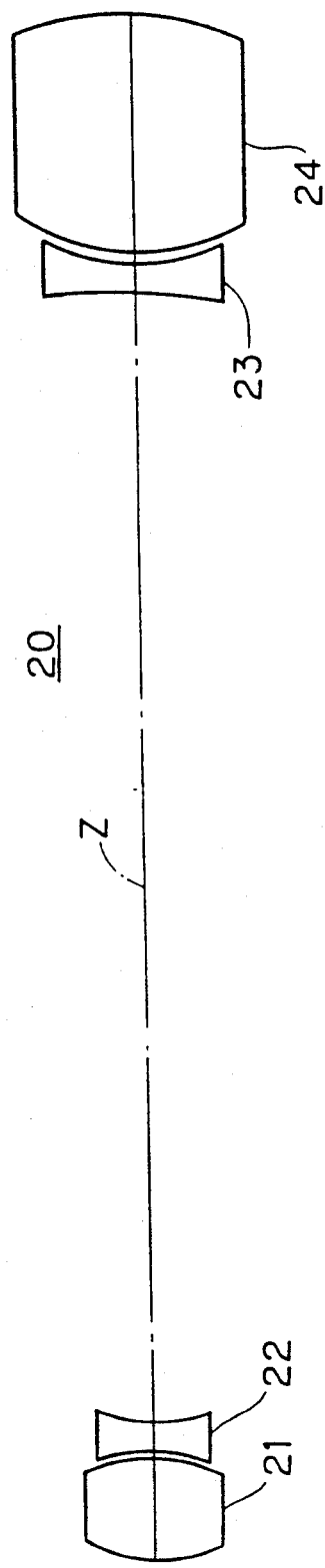

FIG. 6 is a block diagram of an objective lens system according to another example of the first embodiment. The objective lens system 20 is basically structurally identical to the objective lens system 10. That is, the objective lens system 20 includes a first to a fourth lenses 21 to 24, the first to the fourth lenses being serially disposed in that order from an object side (left-hand side of the figure) to an image formation side (right-hand side of the figure) with predetermined air spaces therebetween.

Data of the objective lens system 20 are presented from Table 3.

TABLE 3

| i | radius of curvature $r_i$ | surface-to-surface distance $d_i$ | material |
|---|---|---|---|
| 1 | 3.604 | 2.65 | quartz |
| 2 | −3.914 | 0.18 | |
| 3 | −3.200 | 0.70 | quartz |
| 4 | 3.213 | 28.62 | |
| 5 | −16.300 | 0.70 | quartz |
| 6 | 5.454 | 0.27 | |
| 7 | 5.980 | 6.00 | fluorite |
| 8 | −8.743 | | |

As indicated in Table 3, the first to the third lenses 21 to 23 are all made of quartz, while the fourth lens 24 is made of fluorite.

The focal length f of the objective lens system 20 is 60, the numerical aperture (NA) thereof is 1/24, and the image size thereof is 10.6.

With respect to a wavelength of 298.06 (nm), the powers $\phi_1$, $\phi_2$, $\phi_3$ and $\phi_4$ of the first to fourth lenses 21 to 24, the power $\phi_{34}$ of the composite lens system consisting of the third lens 23 and the fourth lens 24, and the power $\phi$ of the entire system (the objective lens system 20) are respectively as follows:

| $\phi_1 =$ | 0.2302 | $\phi_2 =$ | −0.3155 |
|---|---|---|---|
| $\phi_3 =$ | −0.1208 | $\phi_4 =$ | 0.1117 |
| $\phi_{34} =$ | 0.0220 | $\phi =$ | 0.0167 |

Thus, $|\phi_1/\phi_2| = 0.730$ $|\phi_4/\phi_3| = 0.925$

It is obvious that the objective lens system 20 satisfies the inequalities (2) and (3).

Further, $0.92(\phi_1/\phi) = 12.706$ $1.07(\phi_1/\phi) = 14.777$ $|\phi_2/\phi_{34}| = 14.336$ It is also obvious that the objective lens system 20 satisfies the inequalities (5A) and (5B).

In addition, $|1/\phi_2| = 3.169$ $0.60 \cdot |(4\phi/3\phi_1 - 1)/\phi_1| = 2.355$ $1.1 \cdot |(4\phi/3\phi_1 - 1)/\phi_1| = 4.318$ It is also obvious that the objective lens system 20 satisfies the inequalities (6A) and (6B).

The objective lens system 20 is an infinity corrected objective system, similarly to the objective lens system 10, and acts in combination with the image formation lens system 150. Hence, the equation below gives the imaging magnification M of a microscope utilizing the image formation lens system 150 and the objective lens system 20.

$$M = -f'/f = -300/60 = -5.00$$

FIGS. 7A and 7B illustrate, respectively, the spherical aberration and sine condition in the optical system utilizing the objective lens system 20 and the image formation lens system 150, while FIGS. 7C and 7D show respectively, astigmatism and distortion at light wavelength of 298.06 nm.

According to FIGS. 7A and 7B, serious aberrations at ultraviolet and far ultraviolet light do not occur in the objective lens system 20. Thus, the objective lens system 20 is obviously usable in the ultraviolet and far ultraviolet range. In addition, astigmatism and distortion are restrained in the optical system in which the objective lens system 20 is used (according to FIGS. 7C and 7D).

A-3. Third Example

Figure 8:
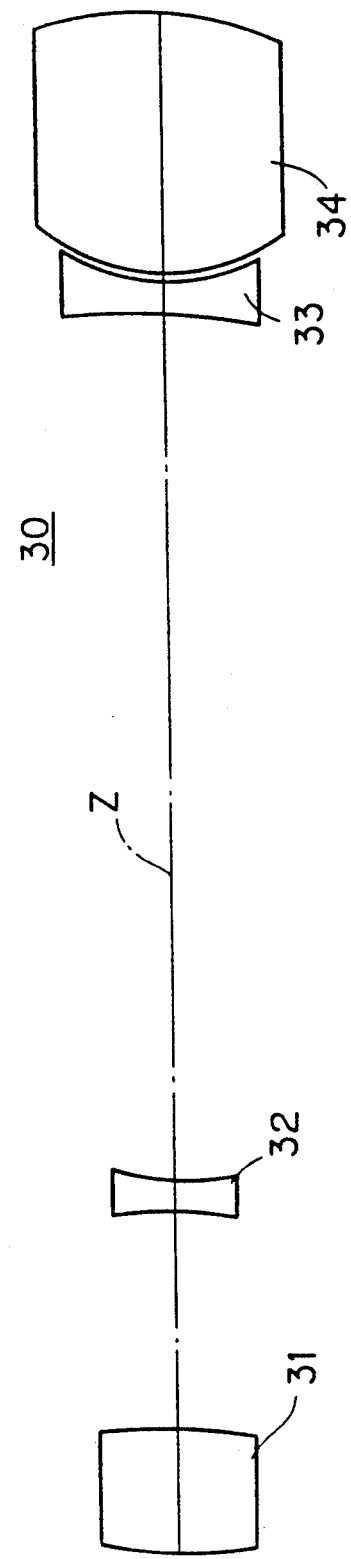

FIG. 8 is a block diagram of an objective lens system according to a further example of the first embodiment. The objective lens system 30 is basically structurally identical to the objective lens system 10. That is, the objective lens system 30 includes a first to a fourth lenses 31 to 34, the first to the fourth lenses being serially disposed in that order from an object side (left-hand side of the figure) to an image formation side (right-hand side of the figure) with predetermined air spaces therebetween.

Data for the objective lens system 30 are shown in Table 4.

TABLE 4

| i | radius of curvature $r_i$ | surface-to-surface distance $d_i$ | material |
|---|---|---|---|
| 1 | 8.462 | 2.90 | quartz |
| 2 | −22.329 | 5.00 | |

TABLE 4-continued

| i | radius of curvature $r_i$ | surface-to-surface distance $d_i$ | material |
|---|---|---|---|
| 3 | −8.450 | 0.70 | quartz |
| 4 | 8.300 | 20.00 | |
| 5 | −18.068 | 0.70 | quartz |
| 6 | 4.957 | 0.21 | |
| 7 | 5.351 | 6.00 | fluorite |
| 8 | −8.369 | | |

As will be understood from Table 4, the first to the third lenses 31 to 33 are made of quartz, whereas the fourth lens 34 is made of fluorite.

The focal length f of the objective lens system 30 is 60, the numerical aperture (NA) thereof is 1/24, and the image size thereof is 10.6.

With respect to a wavelength of 298.06 (nm), the powers $\phi_1$, $\phi_2$, $\phi_3$ and $\phi_4$ of the first to the fourth lenses 31 to 34, the power $\phi_{34}$ of the composite lens system consisting of the third lens 33 and the fourth lens 34, and the power $\phi$ of the entire system (the objective lens system 30) are respectively as follows:

| | | | |
|---|---|---|---|
| $\phi_1 =$ | 0.0771 | $\phi_2 =$ | −0.1182 |
| $\phi_3 =$ | −0.1268 | $\phi_4 =$ | 0.1202 |
| $\phi_{34} =$ | 0.0265 | $\phi =$ | 0.0167 |

Thus, $|\phi_1/\phi_2| = 0.652$ $|\phi_4/\phi_3| = 0.948$

It is obvious that the objective lens system 30 satisfies the inequalities (2) and (3).
Further, $0.92(\phi_1/\phi) = 4.257$ $1.07(\phi_1/\phi) = 4.951$ $|\phi_2/\phi_{34}| = 4.458$ It is also obvious that the objective lens system 30 satisfies the inequalities (5A) and (5B).
In addition, $|1/\phi_2| = 8.458$ $0.60 \cdot |(4\phi/3\phi_1 - 1)/\phi_1| = 5.538$ $1.1 \cdot |(4\phi/3\phi_1 - 1)/\phi_1| = 10.153$ It is also obvious that the objective lens system 30 satisfies the inequalities (6A) and (6B).

The objective lens system 30 is an infinity corrected objective system, similarly to the objective lens system 10, and acts in combination with the image formation lens system 150. Hence, the equation below gives the imaging magnification M of a microscope utilizing the image formation lens system 150 and the objective lens system 30.

$M = -f'/f = -300/60 = -5.00$

FIGS. 9A and 9B illustrate, respectively, the spherical aberration and sine condition in the optical system utilizing the objective lens system 30 and the image formation lens system 150, while FIGS. 9C and 9D show, respectively astigmatism and distortion at light of a wavelength of 298.06 nm.

According to FIGS. 9A and 9B, serious aberrations at ultraviolet and far ultraviolet light do not occur in the objective lens system 30. Thus, the objective lens system 30 is obviously usable in ultraviolet and far ultraviolet range. In addition, astigmatism and distortion are restrained in the optical system in which the objective lens system 30 is used (according to FIGS. 9C and 9D).

A-4. Fourth Example

Figure 10:
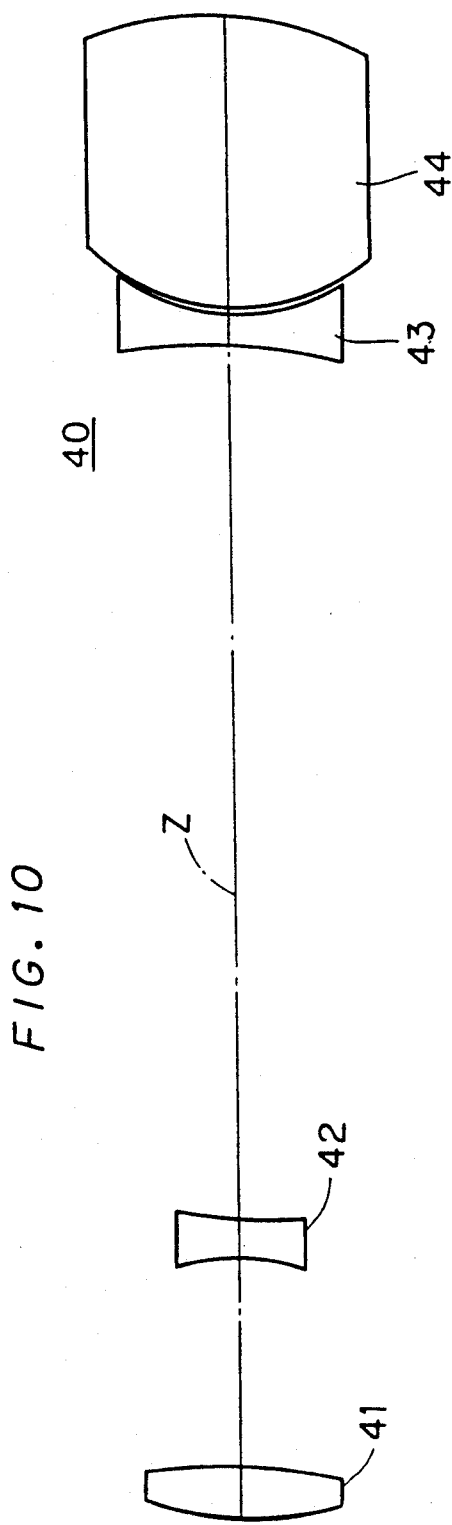

FIG. 10 is a block diagram of an objective lens system according to a further example of the first embodiment. The objective lens system 40 is structurally identical to the objective lens system 10. That is, the objective lens system 40 includes a first to a fourth lenses 41 to 44, the first to the fourth lenses being serially disposed in that order from an object side (left-hand side of the figure) to an image formation side (right-hand side of the figure) with predetermined air spaces therebetween.

Data for the objective lens system 40 are shown in Table 5.

TABLE 5

| i | radius of curvature $r_i$ | surface-to-surface distance $d_i$ | material |
|---|---|---|---|
| 1 | 5.953 | 1.05 | fluorite |
| 2 | −12.957 | 4.40 | |
| 3 | −3.367 | 0.70 | quartz |
| 4 | 9.675 | 17.62 | |
| 5 | −14.427 | 0.70 | quartz |
| 6 | 4.520 | 0.15 | |
| 7 | 4.839 | 6.00 | fluorite |
| 8 | −7.474 | | |

As will be understood from Table 5, the first and the fourth lenses 41 and 44 are made of fluorite, whereas the second he third lenses 42 and 43 are made of quartz.

The focal length f of the objective lens system 40 is 60, the numerical aperture (NA) thereof is 1/24, and the image size thereof is 10.6.

With respect to a wavelength of 298.06 (nm), the powers $\phi_1$, $\phi_2$, $\phi_3$ and $\phi_4$ of the first to the fourth lenses 41 to 44, the power $\phi_{34}$ of the composite lens system consisting of the third lens 43 and the fourth lens 44, and the power $\phi$ of the entire system (the objective lens system are respectively as follows:

| | | | |
|---|---|---|---|
| $\phi_1 =$ | 0.1095 | $\phi_2 =$ | −0.1990 |
| $\phi_3 =$ | −0.1436 | $\phi_4 =$ | 0.1311 |
| $\phi_{34} =$ | 0.0285 | $\phi =$ | 0.0167 |

Thus, $|\phi_1/\phi_2| = 0.550$ $|\phi_4/\phi_3| = 0.913$

It is obvious that the objective lens system 40 satisfies the inequalities (2) and (3).

Further, $0.92(\phi_1/\phi) = 6.043$ $1.07(\phi_1/\phi) = 7.028$ $|\phi_2/\phi_{34}| = 6.989$ It is also obvious that the objective lens system 40 satisfies the inequalities (5A) and (5B).

In addition, $|1/\phi_2| = 5.026$ $0.60 \cdot |(4\phi/3\phi_1 - 1)/\phi_1| = 4.369$ $1.1 \cdot |(4\phi/3\phi_1 - 1)/\phi_1| = 8.009$ It is also obvious that the objective lens system 40 satisfies the inequalities (6A) and (6B).

The objective lens system 40 is an infinity corrected objective system, similarly to the objective lens system 10, and acts in combination with the image formation lens system 150. Hence, the equation below gives the imaging magnification M of a microscope utilizing the image formation lens system 150 and the objective lens system 40.

$M = -f'/f = -300/60 = -5.00$

FIGS. 11A and 11B illustrate, respectively, the spherical aberration and sine condition in the optical system utilizing the objective lens system 40 and the image formation lens system 150, while FIGS. 11C and 11D show, respectively, astigmatism and distortion at light of a wavelength of 298.06 nm.

According to FIGS. 11A and 11B, serious aberrations at ultraviolet and far ultraviolet light do not occur in the objective lens system 40. Thus, the objective lens system 40 is obviously usable in the ultraviolet and far ultraviolet range. In addition, astigmatism and distortion are restrained in the optical system in which the objective lens system 40 is used (according to FIGS. 11C and 11D).

A-5. Effect of First Embodiment

The objective lens systems 10, 20, 30 and 40 according to the first embodiment are all usable in the ultraviolet and/or far ultraviolet range and display excellent properties at light of these ranges. Moreover, in the objective lens systems of the first embodiment, the first to the fourth lenses are separated from each other. This eliminates optical contact between the lenses, and hence successfully lead to cost reduction.

Though not especially described so in the specification, it have been confirmed that aberrations at visible and infrared light are also effectively restrained according to the present invention. Thus, the objective lens systems 10, 20, 30 and 40 are usable in a very wide range, i.e., from infrared to far ultraviolet.

Figure 2:
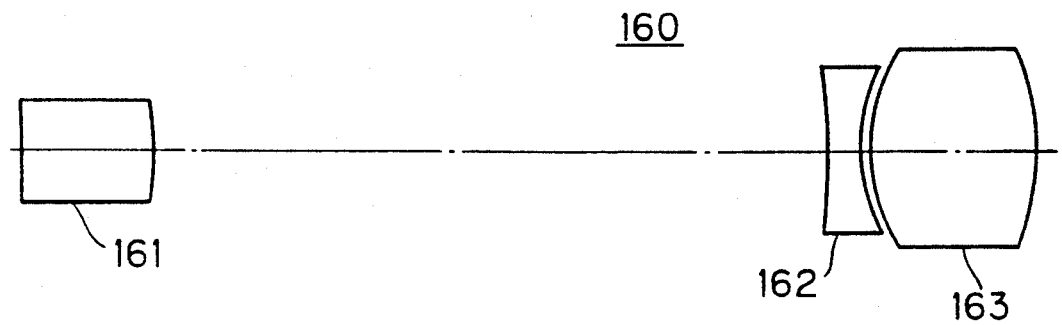

Now referring again to the prior applications, the objective lens system 160 (FIG. 2) is combined with the image formation lens system 150, thereby obtaining an imaging magnification M of −10. More precisely, the focal length of the objective lens system 160 is 30, whereas the focal length of any of the objective lens systems 10, 20, 30 and 40 is 60. Hence, the imaging magnification M can be varied from −10 to −5 by replacing, for instance, the objective lens system 160 with the objective lens system 10 of the first embodiment while fixing the image formation lens system 150 in the same position.

Each of the objective lens systems 10, 20, 30 and 40 has a parfocal relation with respect to the objective lens system 160 as set forth. This eliminates the time consuming process of bringing the microscope into focus after a lens system replacement (for example, after the objective lens system 10 has replaced the objective lens system 160), whereby operation of the microscope is greatly improved.

The objective lens systems 10, 20, 30 and 40 have a pupil diameter which roughly coincides with the pupil of the objective lens system 160. In consequence, the replacement produces only negligible changes in the quantity of illumination light on an object, promising fairy good observation.

B. Second Embodiment

An objective lens system according to a second embodiment of the present invention includes first to third lenses disposed in that order from an object side to an image formation side with predetermined air spacings therebetween. The first lens is a meniscus lens having convex surfaces directed toward an object side, and has a positive power. The second lens has a negative power, whereas the third lens has a positive power.

The first lens is made of either quartz or fluorite, the second lens made of quartz, while the third lens made of fluorite. This enables the objective lens system of the second embodiment to transmit ultraviolet and/or far ultraviolet light, and hence to be used in the ultraviolet and/or far ultraviolet range.

In addition, the first to the third lenses are separated from each other by a predetermined air space; that is, the objective lens system needs no optical contact. This enables obtaining a large reduction in cost for the objective lens system.

The objective lens system causes only negligible aberrations especially when it satisfies the following inequalities:

$1.1 < |\phi_3/\phi_2| < 1.3$ (9)

where symbols $\phi_2$ and $\phi_3$ are the powers of the second and the third lenses, respectively.

The reason is that the correction of the spherical aberration is excessive when the value $|\phi_3/\phi_2|$ is not more than 1.1 and, on the contrary, the correction of the spherical aberration is insufficient when the value $|\phi_3/\phi_2|$ is not less than 1.3.

The objective lens system according to the second embodiment is interchangeable with other objective lens system, according to the prior applications, for forming an image by cooperating with an image formation lens system. In the objective lens system of the second embodiment, chromatic aberration is corrected through the composite lens system consisting of the third lens having the positive power and the second lens having the negative power. A surface of the first lens on the image side (hereinafter referred to as a "second surface") has a large negative power, and thereby the objective lens system is formed into what is called a telephoto type lens system. Consequently, the focal length of the objective lens system grow larger compared to the total length thereof.

The other surface of the first lens on the object side (hereinafter referred to as a "first surface") has a positive power, and thereby the objective lens system has a telecentric characteristic on the object side.

The composite lens system consisting of the second surface of the first lens, the second lens and the third lens has a large focal length and functions as a teleconverter for the first surface of the first lens. That is, the composite lens system magnifies the power of the first surface to adjust the focal length of the objective lens system to a desired value.

For satisfying this condition accurately, the following equation must be satisfied:

$$|\phi_{1+}/\phi| = |\phi_{1-}/\phi_{23}| \quad (10)$$

where $\phi$ is a power of the entire system, and $\phi_{1+}$ and $\phi_{1-}$ are indicated by the following:

$$\phi_{1+} = (n-1)/r_1$$

$$\phi_{1-} = (1-n)/r_2$$

where n: refractive index of the first lens;

$r_1$: radius of curvature of the first surface of the first lens; and $r_2$: radius of curvature of the second surface of the first lens In practice, however, the composite lens system need not be a complete afocal system, but is only required to satisfy the following inequalities (11A) and (11B):

$$0.90 \, |\phi_{1+}/\phi| < |\phi_{1-}/\phi_{23}| \quad (11A)$$

$$1.00 \, |\phi_{1+}/\phi| > |\phi_{1-}/\phi_{23}| \quad (11B)$$

In the case of forming the image of the object through only the composite lens system consisting of the second and the third lenses, the value $|\phi_3/\phi_2|$ is preferably set within the range of 1.3 to 1.4 in consideration of the dispersion of fluorite and quartz. When the objective lens system comprises the first to the third lenses, however, it is rather preferable to set the value so that the aberration caused by the first lens is corrected through the composite lens system. Hence, it is preferable to set the value $|\phi_3/\phi_2|$ within the range of 1.1 to 1.3; that is, to set the objective lens system to satisfy the inequality (9).

Furthermore, in order to give parfocality to the objective lens system of the second embodiment, the following inequalities must be satisfied:

$$0.80 \cdot |(4\phi/3\phi_{1+}-1)/\phi_{1+}| < |1/\phi_{1-}| \quad (12A)$$

$$1.1 \cdot |(4\phi/3\phi_{1+}-1)/\phi_{1+}| > |1/\phi_{1-}| \quad (12B)$$

In the present invention, it is assumed that the focal point of the objective lens system on the image side is located substantially in the composite lens system consisting of the second and the third lenses so that the parfocal length is $\frac{3}{4}$ times larger than the focal length of the objective lens system. Assuming that the interval between principal points of a composite lens system consisting of the second surface and the second and the third lenses is designated by e, the condition represented by the following expression can be obtained:

$$e + 1/\phi_{1+} \approx \tfrac{3}{4}(1/\phi) \quad (13)$$

For providing the objective lens system with the telecentric characteristic on the object side, the pupil of the composite lens system consisting of the second surface, the second lens and the third lens is required to coincide with the focal point of the first surface. Accordingly, the condition represented by the following expression can be obtained:

$$e(1+1/(1+\phi_{1-}\cdot e)) \approx \tfrac{3}{4}(1/\phi) - 2/\phi_{1+} \quad (14)$$

When the conditions (13) and (14) are taken into consideration, the objective lens system is required to satisfy the inequalities (12A) and (12B).

B-1. Fifth Example

Figure 12:
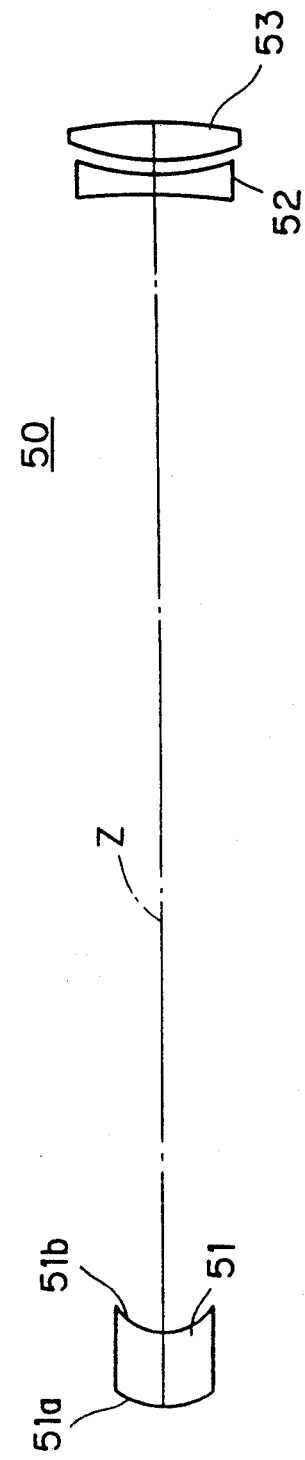
FIGS. 12 and 14 are a block diagram of an objective lens system according to a second embodiments of the present invention.

FIG. 12 is a block diagram of an objective lens system according to a preferred example of the second embodiment. In FIG. 12, an objective lens system 50 includes a first to a third lenses 51 to 53. The lenses 51 to 53 are serially arranged in that order from an object side (left-hand side of the figure) to an image side (right-hand side of the figure) with predetermined air spaces therebetween. The first and the third lenses 51 and 53 have a positive power, whereas the second lens 52 have a negative power. Further, the first lens 51 has a convex surface 51a which is directed toward the object side.

The following table 6 shows lens data of the objective lens system 50:

TABLE 6

| i | radius of curvature $r_i$ | surface-to-surface distance $d_i$ | material |
|---|---|---|---|
| 1 | 2.620 | 2.50 | quartz |
| 2 | 1.988 | 36.81 | |
| 3 | −34.440 | 0.70 | quartz |
| 4 | 7.864 | 0.52 | |
| 5 | 8.720 | 1.35 | fluorite |
| 6 | −10.820 | | |

In Table 6, the symbol $r_i$ represents radius of curvature of an i-th lens surface from the object side (left-hand side in the figure), and the symbol $d_i$ represents a distance between an i-th lens surface and an (i+1)-th lens surface along an optical axis Z, where the subscript i is an integer from one to six. These symbols adhere to Table 7 given later as well. As will be understood from the Table 6, the first and the second lenses 51 and 52 are all made of quartz, while the third lens 53 is made of fluorite.

The focal length f of the objective lens system 50 is 60, the numerical aperture (NA) thereof is 1/24, and the image size thereof is 10.6.

With respect to the wavelength of 298.06 (nm), the power $\phi_{1+}$ of the convex surface 51a of the first lens 51 and the power $\phi_{1-}$ of a surface 51b of the first lens 51 which is directed to the image side are respectively as follows:

| $\phi_{1+} = 0.1864$ | $\phi_{1-} = -0.2467$ |
|---|---|

With respect to the wavelength of 298.06 (nm), the powers $\phi_2$ and $\phi_3$ of the second and the third lenses 52 and 53, the power $\phi_{23}$ of the composite lens system consisting of the second lens 52 and the third lens 53, and the power $\phi$ of the entire system (the objective lens system 50) are:

| $\phi_2 = -0.07670$ | $\phi_3 = 0.09208$ |
|---|---|
| $\phi_{23} = 0.02266$ | $\phi = 0.01667$ |

Thus, $$|\phi_3/\phi_2| = 1.201$$

It is obvious that the objective lens system 50 satisfies the inequality (9).

Further, $0.90 \, |\phi_{1+}/\phi| = 10.07$ $1.00 \, |\phi_{1-}/\phi| = 11.18$ $|\phi_{1-}/\phi_{23}| = 10.84$ It is also obvious that the objective lens system 50 satisfies the inequalities (11A) and (11B).

In addition, $0.80 \cdot |(4\phi/3\phi_{1+} - 1)/\phi_{1+}| = 3.780$ $1.1 \cdot |(4\phi/3\phi_{1+} - 1)/\phi_{1+}| = 5.198$ $|1/\phi_{1-}| = 4.071$ It is also obvious that the objective lens system 50 satisfies the inequalities (12A) and (12B).

The objective lens system 50 is an infinity corrected objective system and acts in combination with the image formation lens system 150. Hence, the equation below gives the imaging magnification M of a microscope utilizing the image formation lens system 150 and the objective lens system 50.

$M = -f'/f = -300/60 = -5.00$

FIGS. 13A and 13B illustrate spherical aberration and sine condition, respectively, in the optical system utilizing the objective lens system 50 and the image formation lens system 150, while FIGS. 13O and 13D show astigmatism and distortion of light at a wavelength of 298.06 nm, respectively.

According to FIGS. 13A and 13B, serious aberrations at ultraviolet and far ultraviolet light do not occur in the objective lens system 50. Thus, the objective lens system 50 is obviously employable in ultraviolet and far ultraviolet range. In addition, astigmatism and distortion are restrained in the optical system in which the objective lens system 50 is used (according to FIGS. 13C and 13D).

B-2. Sixth Example

Figure 14:
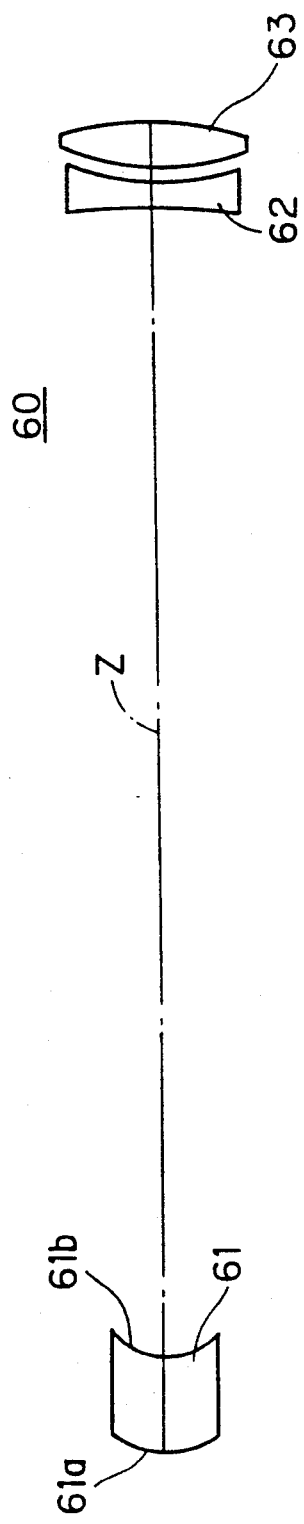

FIG. 14 is a block diagram of an objective lens system according to another example of the second embodiment. An objective lens system 60 is basically identical to the objective lens system 50 in structure. That is, the objective lens system 60 includes a first to a third lenses 61 to 63, the first to the third lenses 61 to 63 being serially disposed in that order from an object side (left-hand side of the figure) to an image formation side (right-hand side of the figure) with predetermined air spaces therebetween.

Data of the objective lens system 60 are available from Table 7.

TABLE 7

| i | radius of curvature $r_i$ | surface-to-surface distance $d_i$ | material |
|---|---|---|---|
| 1 | 2.776 | 3.00 | fluorite |
| 2 | 2.059 | 35.55 | |
| 3 | −34.251 | 0.70 | quartz |
| 4 | 7.866 | 0.48 | |
| 5 | 8.663 | 1.35 | fluorite |
| 6 | −10.707 | | |

As will be understood from the Table 7, the second lens 62 is made of quartz, while the first and the third lens 61 and 63 are all made of fluorite.

The focal length f of the objective lens system 60 is 60, the numerical aperture (NA) thereof is 1/24, and the image size thereof is 10.6.

With respect to the wavelength of 298.06 (nm), the power $\phi_{1+}$ of a convex surface 61a of the first lens 61 and the power $\phi_{1-}$ of a surface 61b of the first lens 61 which is directed to the image side are respectively as follows:

| $\phi_{1+} = 0.1637$ | $\phi_{1-} = -0.2207$ |
|---|---|

With respect to the wavelength of 298.06 (nm), the powers $\phi_2$ and $\phi_3$ consisting of the second and the third lenses 62 and 63, the power $\phi_{23}$ of the composite lens system consisting of the second lens 62 and the third lens 63, and the power $\phi$ of the entire system (the objective lens system 60) are respectively as follows:

| $\phi_2 = -0.07676$ | $\phi_3 = 0.09283$ |
|---|---|
| $\phi_{23} = 0.02313$ | $\phi = 0.01667$ |

Thus, $|\phi_3/\phi_2| = 1.210$

It is obvious that the objective lens system 60 satisfies the inequality (9).

Further, $0.90|\phi_{1+}/\phi| = 8.839$ $1.00|\phi_{1+}/\phi| = 9.82$ $|\phi_{1-}/\phi_{23}| = 9.541$ It is also obvious that the objective lens system 60 satisfies the inequalities (11A) and (11B).

In addition, $0.80 \cdot |(4\phi/3\phi_{1+} - 1)/\phi_{1+}| = 4.224$ $1.1 \cdot |(4\phi/3\phi_{1+} - 1)/\phi_{1+}| = 5.808$ $|1/\phi_{1-}| = 4.531$ It is also obvious that the objective lens system 60 satisfies the inequalities (12A) and (12B).

The objective lens system 60 is an infinity corrected objective system and acts in combination with the image formation lens system 150. Hence, the equation below gives the imaging magnification M of a microscope utilizing the image formation lens system 150 and the objective lens system 60.

$M = -f'/f = -300/60 = -5.00$

FIGS. 15A and 15B illustrate spherical aberration and sine condition, respectively, in the optical system utilizing the objective lens system 60 and the image formation lens system 150, while FIGS. 15C and 15D showing astigmatism and distortion at light of a wavelength of 298.06 nm, respectively.

According to FIGS. 15A and 15B, serious aberrations at ultraviolet and far ultraviolet light do not occur in the objective lens system 60. Thus, the objective lens system 60 is obviously employable in the ultraviolet and far ultraviolet range. In addition, astigmatism and distortion are restrained in the optical system in which the objective lens system 60 is used (according to FIGS. 15C and 15D).

B-3. Effect of Second Embodiment

The objective lens systems 50 and 60 according to the second embodiment are all employable in the ultraviolet and/or far ultraviolet range and display excellent properties at light of these ranges. Moreover, in the objective lens systems of the second embodiment, the first to the third lenses are separated from each other. This eliminates optical contact between the lenses, and hence would successfully lead to cost reduction.

Though not especially described in the specification, it is confirmed that aberrations at visible and infrared light are also effectively restrained according to the present invention. Thus, the objective lens systems 50 and 60 are employable in a very wide range, i.e., from infrared to far ultraviolet.

Now referring again to the prior applications, the objective lens system 160 (FIG. 2) is combined with the image formation lens system 150, thereby to obtain the imaging magnification M of −10. More precisely, the focal length of the objective lens system 160 is 30, whereas the focal length of any of the objective lens systems 50 and 60 is 60. Hence, the imaging magnification M can be varied from −10 to −5 by replacing, for instance, the objective lens system 160 with the objective lens system 50 of the second embodiment while fixing the image formation lens system 150 in the same position.

Each of the objective lens systems 50 and 60 has a parfocal relation with respect to the objective lens system 160 as set forth. This eliminates the time consuming process of bringing the microscope into focus after replacement (for example, after the objective lens system 10 has replaced the objective lens system 160), whereby operation of the microscope would be greatly improved.

The objective lens systems 50 and 60 have a pupil diameter which roughly coincides with the pupil of the objective lens system 160. In consequence, the replacement accompanies only negligible changes in quantity of illumination light onto an object, promising fairly good observation.

C. Third Embodiment

An objective lens system according to a third embodiment of the present invention includes a first to a third lens groups disposed in that order from an object side to an image formation side with predetermined air spacings therebetween. The first lens group includes a lens which is made of either quartz or fluorite and which has a positive power. The second lens group includes a lens which is made of quartz and which has a negative power. The third lens group includes a lens pair or two lens pairs spaced apart from each other. Each lens pair consists of a negative lens made of quartz and a positive lens made of fluorite, the lenses being apart from each other. Thus, light in the ultraviolet or far ultraviolet region can transmit the objective lens system. In consequence, the objective lens system is useful in the ultraviolet and far ultraviolet regions.

In addition to this, the respective lenses are separated from each other at predetermined air intervals. Therefore, the optical contact is not required and the objective lens system can be provided at low cost.

Furthermore, the third lens group is provided with the lens pair which consists of the positive lens made of fluorite and the negative lens made of quartz. This allows various aberrations such as spherical aberration and chromatic aberration to be corrected.

The objective lens system according to the third embodiment is interchangeable with other objective lens system, according to the prior applications, for forming an image by cooperating with an image formation lens system. In the objective lens system, correction of chromatic aberration is carried out through the third lens group consisting of the positive lens and the negative lens. The second lens group having the large negative power is provided between the first and the third lens groups so that the objective lens system is a so-called telephoto type lens system. Thus, the focal length of the objective lens system grows larger compared to the total length thereof.

The first lens group having the positive power is provided so that the objective lens system has a telecentric characteristic on the object side.

From another viewpoint, a composite lens system consisting of the second and the third lens groups has a large focal length and functions as a teleconverter of the first lens group. That is, the composite lens system magnifies the focal length of the first lens group to adjust the focal length of the objective lens system to a desired value.

For satisfying this condition accurately, the following equation must be satisfied:

$$|\phi_1/\phi| = |\phi_2/\phi_3| \tag{15}$$

where $\phi_1$, $\phi_2$ and $\phi_3$ are powers of the first to the third lens groups, respectively, and $\phi$ is a power of the entire system. In practice, however, the composite lens system need not be a complete afocal system, but is only required to satisfy the following inequalities (16A) and (16B):

$$0.95 \cdot |\phi_1/\phi| < |\phi_2/\phi_3| \tag{16A}$$

$$1.05 \cdot |\phi_1/\phi| > |\phi_2/\phi_3| \tag{16B}$$

In the case of forming the image of the object through only the lens pair, the value $|\phi_+/\phi_-|$ is preferably set within the range of 1.3 to 1.4 in consideration of the dispersion of fluorite and quartz, where $\phi_+$, $\phi_-$ are powers of the positive and the negative lenses of the third lens group, respectively. However, when the objective lens system includes the first to the third lens groups, it is rather preferable that the aberration caused by the first and the second lens groups is corrected through the third lens group. Hence, it is preferable to set the value $|\phi_+/\phi_-|$ within the range of 1.00 to 1.20, that is, to set the objective lens system to satisfy the following inequality (17):

$$1.0 < |\phi_+/\phi_-| < 1.2 \tag{17}$$

Furthermore, in order to attain parfocality, the objective lens system must satisfy the following inequality (18):

$$0.8 \cdot a < |\phi_2| < 1.1 \cdot a \tag{18}$$

where $$\alpha = \left| \frac{\phi_1}{e_{12} \cdot \phi_1 - 1} - \frac{1}{0.3/\phi - 1/\phi_1 - e_{12}} \right|$$

where $e_{12}$ is an interval between principal points of a lens system consisting of the first and the second lens groups. In the present invention, it may be assumed that the focal point of the objective lens system on the image side is located substantially in the third lens group so that the parfocal length is 0.3 times the focal length of the objective lens system. With respect to the interval $e_{12}$ between principal points of the lens system consisting of the first and the second lens groups and an interval $e_{23}$ between principal points of a lens system consisting of the second and the third lens groups, the condition represented by the following expression can be obtained:

$$e_{23} \approx 0.3/\phi - 1/\phi_1 - e_{12} \qquad (19)$$

For providing the objective lens system with the telecentric characteristic on the object side, the pupil of the composite lens system consisting of the second and the third lens groups is required to coincide with the focal point of the first lens group. Accordingly, the condition represented by the following expression can be obtained:

$$e_{23} \cdot (1 + 1/(1 + \phi_2 \cdot e_{23})) \approx 0.3/\phi - 2/\phi_1 \qquad (20)$$

When the conditions (19) and (20) are taken into consideration, the objective lens system is required to satisfy the inequality (18).

C-1. Seventh Example

Figure 16:
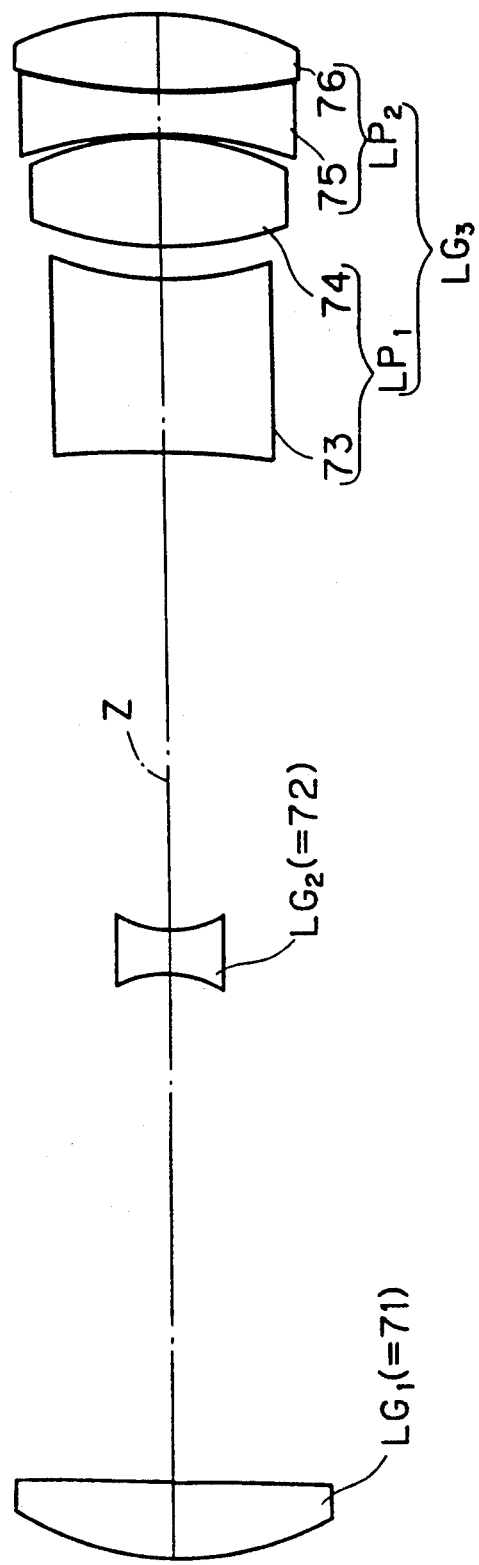

FIG. 16 is a block diagram of an objective lens system according to a preferred example of the third embodiment. In FIG. 16, an objective lens system 70 includes a first to a third lens groups $LG_1$ to $LG_3$. The first to the third lens groups $LG_1$ to $LG_3$ are arranged at predetermined air intervals serially from an object side (left-hand side of the figure) to an image side (right-hand side of the figure). The first lens group $LG_1$ includes a lens 71 having a positive power, and the second lens group $LG_2$ includes a lens 72 having a negative power. The third lens group $LG_3$ includes two lens pairs $LP_1$ and $LP_2$ arranged at a predetermined air interval. In the lens pair $LP_1$, a lens 73 having a negative power and a lens 74 having a positive power are arranged at a predetermined air interval serially from the object side to the image side. Similarly, in the lens pair $LP_2$, a negative lens 75 and a positive lens 76 are arranged at a predetermined air interval serially from the object side to the image side.

The following table 8 shows lens data of the objective lens system 70:

TABLE 8

| i | radius of curvature $r_i$ | surface-to-surface distance $d_i$ | material |
|---|---|---|---|
| 1 | 6.272 | 1.60 | fluorite |
| 2 | −1244.835 | 10.15 | |
| 3 | −2.423 | 0.90 | quartz |
| 4 | 1.695 | 9.50 | |
| 5 | −22.167 | 3.55 | quartz |
| 6 | 6.070 | 0.68 | |
| 7 | 7.910 | 2.20 | fluorite |
| 8 | −6.643 | 0.10 | |
| 9 | −10.110 | 0.90 | quartz |
| 10 | 15.910 | 0.10 | |
| 11 | 25.393 | 1.45 | fluorite |
| 12 | −6.900 | | |

In Table 8, the symbol $r_i$ represents radius of curvature of an i-th lens surface from the object side (left-hand side in the figure), and the symbol $d_i$ represents a distance between an i-th lens surface and an (i+1)-th lens surface along an optical axis Z, where the subscript i is an integer from one to twelve. As will be understood from the Table 8, the lenses 72, 73 and 75 are made of quartz, whereas the lenses 71, 74 and 76 are made of fluorite.

The focal length f of the objective lens system 70 is 150, the numerical aperture (NA) thereof is 1/60, and the image size thereof is 10.6.

With respect to the wavelength of 298.06 (nm), powers $\phi_1$, $\phi_2$ and $\phi_3$ of the first to third lens groups $LG_1$, $LG_2$ and $LG_3$, and a power $\phi$ of the entire system (the objective lens system 70) are respectively as follows:

| | |
|---|---|
| $\phi_1 = 0.07279$ | $\phi_2 = -0.5278$ |
| $\phi_3 = 0.04808$ | $\phi = 0.006667$ |

Powers $\phi_{-1}$ and $\phi_{+1}$ of the lenses 73 and 74 and powers $\phi_{-2}$ and $\phi_{+2}$ of the lenses 75 and 76 are as follows:

| | |
|---|---|
| $\phi_{-1} = -0.1067$ | $\phi_{+1} = 0.1199$ |
| $\phi_{-2} = -0.07990$ | $\phi_{+2} = 0.08258$ |

An interval $e_{12}$ between principal points of a lens system consisting of the first and the second lens groups $LG_1$ and $LG_2$ is as follows:

$$e_{12} = 11.58$$

Thus, $$0.95 \cdot |\phi_1 \phi| = 10.37$$

$$1.05 \cdot |\phi_1/\phi| = 11.46$$

$$|\phi_2/\phi_3| = 10.92$$

It is obvious that the objective lens system 70 satisfies the inequalities (16A) and (16B), respectively.

Further, $$|\phi_{+1}/\phi_{-1}| = 1.124$$

$$|\phi_{+2}/\phi_{-2}| = 1.034$$

It is also obvious that the objective lens system 70 satisfies the inequality (17).

In addition, $$0.8 \cdot \alpha = 0.4107$$

$$1.1 \cdot \alpha = 0.5647$$

It is also obvious that the objective lens system 70 satisfies the inequality (18).

The objective lens system 70 is an infinity corrected objective system and acts in combination with the image formation lens system 150. Hence, the equation below gives the imaging magnification M of a microscope utilizing the image formation lens system 150 and the objective lens system 70.

$$M = -f'/f = -300/150 = -2.00$$

FIGS. 17A and 17B illustrate spherical aberration and sine condition, respectively, in the optical system utilizing the objective lens system 70 and the image formation lens system 150, while FIGS. 17C and 17D showing astigmatism and distortion at light of a wavelength of 298.06 nm, respectively.

According to FIGS. 17A and 17B, serious aberrations at ultraviolet and far ultraviolet light do not occur in the objective lens system 70. Thus, the objective lens system 70 is obviously employable in ultraviolet and far ultraviolet range. In addition, astigmatism and distortion are restrained in the optical system in which the objective lens system 70 is used (according to FIGS. 17C and 17D).

C-2. Eighth Example

FIG. 18 is a block diagram of an objective lens system according to another example of the third embodiment. An objective lens system 80 according to the second preferred embodiment is basically similar to the objective lens system 70 in structure, except that the third lens group $LG_3$ is composed of one lens pair $LP_1$ in the eighth example.

The following table 9 shows lens data of the objective lens system 80:

TABLE 9

| i | radius of curvature $r_i$ | surface-to-surface distance $d_i$ | material |
|---|---|---|---|
| 1 | 6.196 | 1.70 | fluorite |
| 2 | −54.673 | 8.90 | |
| 3 | −2.970 | 0.90 | quartz |
| 4 | 1.742 | 14.27 | |
| 5 | −14.916 | 6.00 | quartz |
| 6 | 5.320 | 0.15 | |
| 7 | 5.657 | 1.95 | fluorite |
| 8 | −6.632 | | |

As will be understood from Table 9, the lenses 82 and 83 are made of quartz, where the lenses 81 and 84 are made of fluorite.

The focal length f of the objective lens system 80 is 150, the numerical aperture (NA) thereof is 1/60, and the image size thereof is 10.6.

With respect to the wavelength of 298.06 (nm), powers $\phi_1$, $\phi_2$ and $\phi_3$ of the first to the third lens groups $LG_1$, $LG_2$ and $LG_3$, and a power $\phi$ of the entire system (the objective lens system 80) are respectively as follows:

| $\phi_1 =$ 0.08094 | $\phi_2 =$ −0.4727 |
|---|---|
| $\phi_3 =$ 0.03893 | $\phi =$ 0.006663 |

Powers $\phi_-$ and $\phi_+$ of the lenses 83 and 84 are as follows:

| $\phi_- =$ −0.1367 | $\phi_+ =$ 0.1415 |
|---|---|

An interval $e_{12}$ between principal points of a lens system consisting of the first and the second lens groups $LG_1$ and $LG_2$ is as follows:

$$e_{12} = 10.32$$

Thus, $$0.95 \cdot |\phi_1/\phi| = 11.54$$

$$1.05 \cdot |\phi_1/\phi| = 12.75$$

$$|\phi_2/\phi_3| = 12.14$$

It is obvious that the objective lens system 80 satisfies the inequalities (16A) and (16B), respectively.

Further, $$|\phi_+/\phi_-| = 1.035$$

It is also obvious that the objective lens system 80 satisfies the inequality (17).

In addition, $$0.8 \cdot \alpha = 0.4284$$

$$1.1 \cdot \alpha = 0.5891$$

It is also obvious that the objective lens system 80 satisfies the inequality (18).

The objective lens system 80 is an infinity corrected objective system and acts in combination with the image formation lens system 150. Hence, the equation below gives the imaging magnification M of a microscope utilizing the image formation lens system 150 and the objective lens system 80.

$$M = -f'/f = -300/150 = -2.00$$

FIGS. 19A and 19B illustrate spherical aberration and sine condition, respectively, in the optical system utilizing the objective lens system 80 and the image formation lens system 150, while FIGS. 19C and 19D show astigmatism and distortion of light at a wavelength of 298.06 nm, respectively.

According to FIGS. 19A and 19B, serious aberrations at ultraviolet and far ultraviolet light do not occur in the objective lens system 80. Thus, the objective lens system 80 is obviously employable in the ultraviolet and far ultraviolet range. In addition, astigmatism and distortion are restrained in the optical system in which the objective lens system 80 is used (according to FIGS. 19C and 19D).

C-3. Ninth Example

FIG. 20 is a block diagram of an objective lens system according to another example of the third embodiment. An objective lens system 90 is identical to the objective lens system 80 in structure.

Table 10 shows lens data of the objective lens system 90:

TABLE 10

| i | radius of curvature $r_i$ | surface-to-surface distance $d_i$ | material |
|---|---|---|---|
| 1 | 6.486 | 1.55 | quartz |
| 2 | 163.900 | 9.90 | |
| 3 | −3.670 | 0.90 | quartz |
| 4 | 2.048 | 15.60 | |
| 5 | −14.981 | 6.00 | quartz |
| 6 | 5.592 | 0.20 | |
| 7 | 6.032 | 1.90 | fluorite |
| 8 | −6.885 | | |

As will be understood from Table 10, the lenses 91 to 93 are made of quartz and the lens 94 is made of fluorite.

The focal length f of the objective lens system 90 is 150, the numerical aperture (NA) thereof is 1/60, and the image size thereof is 10.6.

With respect to the wavelength of 298.06 (nm), powers $\phi_1$, $\phi_2$ and $\phi_3$ of the first to the third lens groups $LG_1$, $LG_2$ and $LG_3$, and a power $\phi$ of the entire system (the objective lens system 90) are respectively as follows:

| | |
|---|---|
| $\phi_1 = 0.07255$ | $\phi_2 = -0.3907$ |
| $\phi_3 = 0.03602$ | $\phi = 0.006667$ |

Powers $\phi_-$ and $\phi_+$ of the lenses 93 and 94 are as follows:

| | |
|---|---|
| $\phi_- = -0.1314$ | $\phi_+ = 0.1348$ |

An interval $e_{12}$ between principal points of a lens system consisting of the first and the second lens groups $LG_1$ and $LG_2$ is as follows:

$e_{12} = 11.35$

Thus, $0.95 \cdot |\phi_1/\phi| = 10.34$ $1.05 \cdot |\phi_1/\phi| = 11.43$ $|\phi_2/\phi_3| = 10.85$ It is obvious that the objective lens system 90 satisfies the inequalities (16A) and (16B), respectively.

Further, $|\phi_+/\phi_{31}| = 1.026$

It is also obvious that the objective lens system 90 satisfies the inequality (17).

In addition, $0.8 \cdot a = 0.3690$ $1.1 \cdot a = 0.5074$

It is also obvious that the objective lens system 90 satisfies the inequality (18).

The objective lens system 90 is an infinity corrected objective system and acts in combination with the image formation lens system 150. Hence, the equation below gives the imaging magnification M of a microscope utilizing the image formation lens system 150 and the objective lens system 90.

$M = -f'/f = -300/150 = -2.00$

FIGS. 21A and 21B illustrate spherical aberration and sine condition, respectively, in the optical system utilizing the objective lens system 90 and the image formation lens system 150, while FIGS. 21C and 21D show astigmatism and distortion of light at a wavelength of 298.06 nm, respectively.

According to FIGS. 21A and 21B, serious aberrations at ultraviolet and far ultraviolet light do not occur in the objective lens system 90. Thus, the objective lens system 90 is obviously employable the ultraviolet and far ultraviolet range. In addition, astigmatism and distortion are restrained in the optical system in which the objective lens system 90 is used (according to FIGS. 21C and 21D).

C-4. Effect of Seventh to Ninth Embodiments

The objective lens systems 70, 80 and 90 according to the third embodiment are all employable in ultraviolet and/or far ultraviolet range and display excellent properties at light of these ranges. Moreover, in the objective lens systems of the third embodiment, the lenses of the objective lens system are separated from each other. This eliminates optical contact between the lenses, and hence would successfully lead to cost reduction.

Though not having especially described in the specification, it is confirmed that aberrations at visible and infrared light are also effectively restrained according to the present invention. Thus, the objective lens systems 70, 80 and 90 are employable in a very wide range, i.e., from infrared to far ultraviolet.

Now referring again to the precedent applications, the objective lens system 160 (FIG. 2) is combined with the image formation lens system 150, thereby to obtain the imaging magnification M of $-10$. More precisely, the focal length of the objective lens system 160 is 30, whereas the focal length of any of the objective lens systems 70, 80 and 90 is 150. Hence, the imaging magnification M can be varied from $-10$ to $-2$ by replacing, for instance, the objective lens system 160 with the objective lens system 70 of the third embodiment while fixing the image formation lens system 150 in the same position.

Each of the objective lens systems 70, 80 and 90 has a parfocal relation with respect to the objective lens system 160 as set forth. This eliminates the time consuming process of bringing the microscope into focus after replacement (for example, after the objective lens system 70 has replaced the objective lens system 160), whereby operation of the microscope would be greatly improved.

The objective lens systems 70, 80 and 90 have a pupil diameter which roughly coincides with the pupil of the objective lens system 160. In consequence, the replacement accompanies only negligible changes in quantity of illumination light onto an object, promising fairly good observation.

D. System for Measuring Film Thickness

Figure 22:
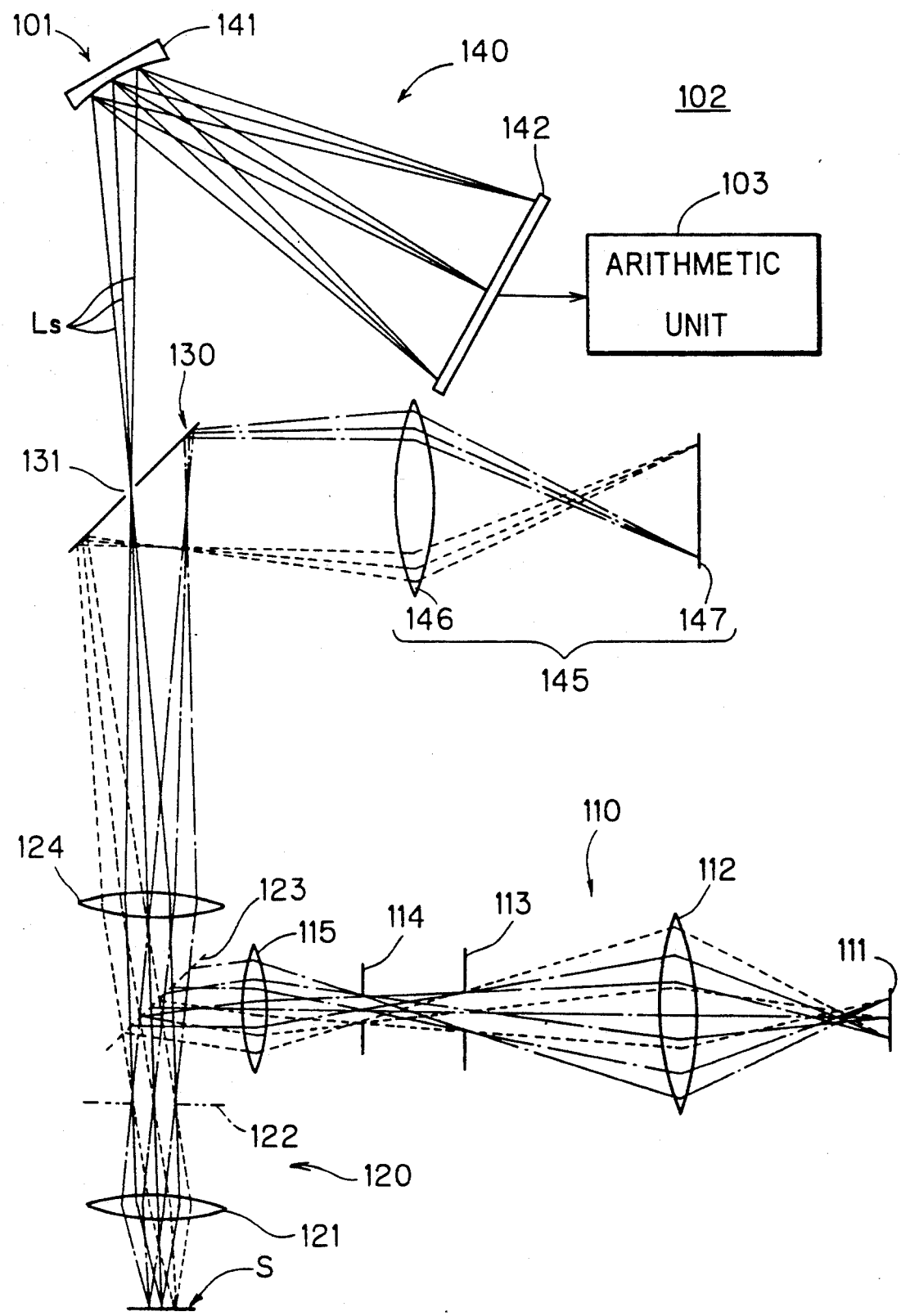
FIG. 22 is a schematic block diagram of a system for measuring film thickness.

FIG. 22 is a schematic block diagram of a system 102 for measuring film thickness. The system 102 includes a microspectroscope 101 for detecting the spectrum of a sample to be measured and an arithmetic unit 103 for calculating the film thickness of the measured sample S on the basis of spectral data obtained by the microspectroscope 101. The microspectroscope 101 includes an illuminating optical system 110, a microscopic optical system 120, a reflecting mirror 130, a spectroscopic unit 140, and a monitoring optical system 145.

The illuminating optical system 110 includes a light source 111 for projecting light which includes ultraviolet and far ultraviolet rays, a condenser lens 112, an aperture stop 113, a field stop 114 and another condenser lens 115. Thus, illuminating light from the light source 111 is guided to the microscopic optical system 120 through the condenser lens 112, the aperture stop 113, the field stop 114 and the condenser lens 115.

The microscopic optical system 120 includes an objective lens system 121 which is identical to that shown in FIG. 3, an image formation lens system 124 which is identical to that shown in FIG. 4 and a beam splitter 123 provided between the objective lens system 121 and the image formation lens system 124. Symbol 122 denotes a pupil position of the objective lens system 121.

The illuminating light from the light source 111 passes through the condenser lens 112, the aperture stop 113, the field stop 114 and the condenser lens 115, and is guided to the objective lens system 121 by the beam splitter 123. The illuminating light is through the objective lens system 121 and is applied onto the surface of a measured sample S. The sample S is supported by a sample holder (not shown).

Reflected light from the surface of the measured sample S is enlarged by the lens 121 and imaged at a position close to the reflecting mirror 130, the beam splitter 123 and the image formation lens system 124.

The reflecting mirror 130 is provided with a pinhole 131. Reflected light $L_S$ passing through the pinhole 131 enters the spectroscopic unit 140.

The spectroscopic unit 140 is formed by a diffraction grating 141 for separating the reflected light $L_S$ into spectral components and a photo detector 142 for detecting the spectrum of the spectrally diffracted light. The diffraction grating 141 may be prepared by a flat field type diffraction grating which images a spectrum on a flat plane. Alternatively, the diffraction grating may have a sweeper. The photo detector 142, which is formed by a photodiode array or a COD, for example, is conjugate with the pinhole 131. Alternatively, the photo detector 142 may include a photomultiplier.

Since the spectroscopic unit 140 has the aforementioned structure, the reflected light $L_S$ is separated into its spectral components by the diffraction grating 141, and the respective spectral components are received by the photo detector 142, which in turn outputs a signal corresponding to the spectrum of the light $L_S$.

The light reflected by the reflecting mirror 130 enters the monitoring optical system 145, and is imaged at an image-formation position 147 through a relay lens 146. Thus, an enlarged image of the surface of the sample S is imaged on an image-formation plane, so that the measuring position of the sample S can be confirmed and focusing can be performed on the basis of the enlarged image.

Figure 23:
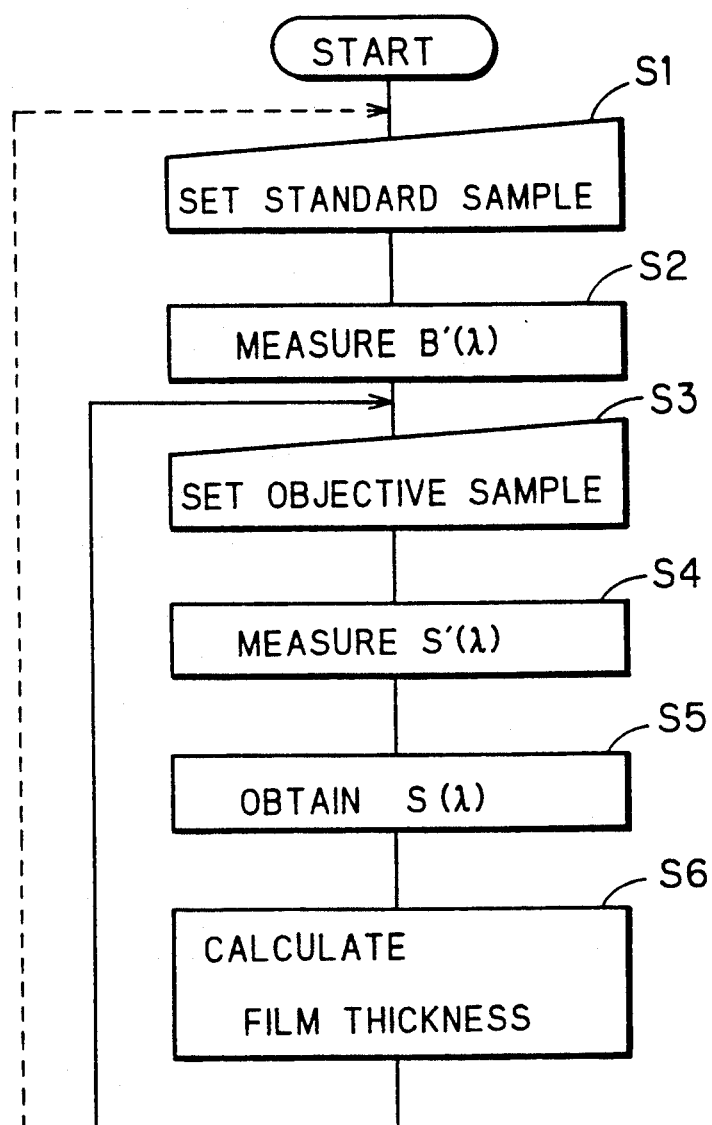
FIG. 23 is a flow chart showing a method of measuring film thickness by the system of FIG. 22.

FIG. 23 is a flow chart of a method of measuring film thickness. Prior to using the measuring system 102, an operator inputs spectrum data B(λ) of a sample (hereinafter referred to as "standard sample"), whose spectrum data is known, in the arithmetic unit 103 through a keyboard (not shown), to store the data in a memory (not shown) provided in the arithmetic unit 103. The standard sample may be a silicon substrate, a substrate which is deposited with aluminum on its surface, or the like.

Then the operator sets the standard sample on the sample holder of the microspectroscope 101 (step S1), and supplies a command for detecting calibration data to the arithmetic unit 103. In response to a command from the arithmetic unit 103, the microspectroscope 101 detects the spectrum of the standard sample, to store data B'(λ) relating to the spectrum in the memory of the arithmetic unit 103 (step S2).

Then, the operator removes the standard sample from the microspectroscope 101 and sets the measured sample S on the sample holder (step S3). Thereafter, the operator supplies a command to the arithmetic unit 103 to start measurement, so that the microspectroscope 101 detects the spectrum of the measured sample S in response to a command from the arithmetic unit 103, to store data S'(λ) relating to the spectrum thereof in the memory of the arithmetic unit 103 (step S4).

The data S'(λ), B(λ) and B'(λ) stored in the memory are read (step S5) into the arithmetic unit 103, to obtain data S(λ) in accordance with the following expression:

$$S(\lambda) = \frac{B(\lambda)}{B'(\lambda)} \cdot S'(\lambda) \quad (21)$$

The data S(λ) corresponds to a signal from the microspectroscope 101 on the assumption that absolutely no influence is caused by factors such as spectral transmittance characteristics of the illuminating optical system 110 and the microscopic optical system 120. In other words, the data S(λ) shows the true spectrum of the measured sample S.

On the basis of the data S(λ) obtained during step S5, the arithmetic unit 103 calculates the thickness of the thin film (step S6). The principle of calculating film thickness is well known in the art, and hence description thereof is omitted.

As understood from the expression (21), the data S'(λ) relating to the actually measured spectrum is calibrated in the aforementioned manner to obtain the data S(λ) relating to the true spectrum, whereby the film thickness can be accurately measured.

The present invention can be employed within the restricted to use within a system for measuring film thickness. The invention has general applications as an objective lens optical system.

Although the present invention has been described and illustrated in detail, it is to be clearly understood that the same is by way of illustration and example only and is not to be taken by way of limitation. The spirit and scope of the present invention should be limited only by the terms of the appended claims.

What is claimed is:

1. An objective lens system for use within a microscope, comprising:
   a first lens made of either quartz or fluorite, said first lens having a positive power;
   a second and a third lens made of quartz, both said second and said third lenses having a negative power; and
   a fourth lens made of fluorite, said fourth lens having a positive power,
   wherein said first to said fourth lenses are disposed in that order from an object side to an image formation side with predetermined air spacings therebetween.

2. An objective lens system according to claim 1, wherein the following inequalities are satisfied:

$$0.54 < |\phi_1/\phi_2| < 0.75$$

$$0.90 < |\phi_4/\phi_3| < 0.95$$

where $\phi_1$, $\phi_2$, $\phi_3$ and $\phi_4$ are the powers of said first to said fourth lenses, respectively.

3. An objective lens system for use within a microscope, which is interchangeable with other objective lens system for forming an image at a predetermined imaging magnification when cooperates with an image formation lens system, and which can roughly half imaging magnification when cooperates in combination with said image formation lens system in place of said other objective lens system, said objective lens system comprising:
  a first lens made of either quartz or fluorite, said first lens having a positive power;
  a second and a third lenses made of quartz, both of said second and said third lenses having a negative power; and
  a fourth lens made of fluorite, said fourth lens having a positive power,
  wherein said first to said fourth lenses are disposed in that order from an object side to an image formation side with predetermined air spacings therebetween,
  and wherein the following inequalities are satisfied:

$$0.54 < |\phi_1/\phi_2| < 0.75$$

$$0.90 < |\phi_4/\phi_3| < 0.95$$

where $\phi_1$, $\phi_2$, $\phi_3$ and $\phi_4$ are the powers of said first to said fourth lenses, respectively.

4. An objective lens system for use within a microscope, comprising:
  a first lens being a meniscus lens made of either quartz or fluorite, said first lens having a positive power, said first lens having a convex surface directed toward an object;
  a second lens made of quartz, said second lens having a negative power; and
  a third lens made of fluorite, said third lens having a positive power,
  wherein said first to said third lenses are disposed in that order from an object side to an image formation side with predetermined air spacings therebetween.

5. An objective lens system according to claim 4, wherein the following inequalities are satisfied:

$$1.1 < |\phi_3/\phi_2| < 1.3$$

where $\phi_2$ and $\phi_3$ are the powers of said second and said third lenses, respectively.

6. An objective lens system for use within a microscope, which is interchangeable with other objective lens system for forming an image at a predetermined imaging magnification when cooperates with an image formation lens system, and which can roughly half imaging magnification when cooperates in combination with said image formation lens system in place of said other objective lens system, said objective lens system comprising:
  a first lens being a meniscus lens made of either quartz or fluorite, said first lens having a positive power, said first lens having a convex surface directed toward an object;
  a second lens made of quartz, said second lens having a negative power; and
  a third lens made of fluorite, said third lens having a positive power,
  wherein said first to said third lenses are disposed in that order from an object side to an image formation side with predetermined air spacings therebetween,
  and wherein the following inequalities are satisfied:

$$1.1 < |\phi_3/\phi_2| < 1.3$$

$$0.90|\phi_{1+}/\phi| < |\phi_{1-}/\phi_{23}|$$

$$100|\phi_{1+}/\phi| > |\phi_{1-}/\phi_{23}|$$

$$0.80 \cdot |(4\phi/3\phi_{1+} - 1)/\phi_{1+}| < |1/\phi_{1-}|$$

$$1.1 \cdot |(4\phi/3\phi_{1+} - 1)/\phi_{1+}| > |1/\phi_{1-}|$$

where $\phi_1$, $\phi_2$ and $\phi_3$ are the powers of said first to said third lenses, respectively, $\phi_{23}$ is a power of a composite lens system consisting of said second and said third lenses, $\phi$ is a power of the entire system, and $$\phi_{1+} = (n-1)/r_1$$

$$\phi_{1-} = (1-n)/r_2$$

where
  n: refractive index of said first lens
  $r_1$: radius of curvature of a surface of said first lens which is directed to the object side
  $r_2$: radius of curvature of a surface of said first lens which is directed to the image side.

7. An objective lens system for use within a microscope, comprising:
  a first lens group including a lens made of either quartz or fluorite, said lens having a positive power;
  a second lens group including a lens made of quartz, said lens having a negative power; and
  a third lens group including a lens pair, said lens pair comprising a lens having a positive power and a lens having a negative power, said positive lens made of fluorite, said negative lens made of quartz, said positive and negative lenses being separated from each other,
  wherein said first to said third lens groups are disposed in that order from an object side to an image formation side with predetermined air spacings therebetween.

8. An objective lens system according to claim 7, wherein said third lens group comprises two lens pairs, said lens pairs being apart from each other.

9. An objective lens system for use within a microscope, which is interchangeable with other objective lens system for forming an image at a predetermined imaging magnification when cooperates with an image formation lens system, and which can roughly half imaging magnification when cooperates in combination with said image formation lens system in place of said other objective lens system, said objective lens system comprising:
  a first lens group including a lens made of either quartz or fluorite, said lens having a positive power; a second lens group including a lens made of quartz, said lens having a negative power; and a third lens group including a lens pair, said lens pair comprising a lens having a positive power and a lens having a negative power, said positive lens made of fluorite, said negative lens made of quartz, said positive and negative lenses being separated from each other,
  wherein said first to said third lens groups are disposed in that order from an object side to an image formation side with predetermined air spacings therebetween, and
  wherein said objective lens system satisfies:

$$0.95 \cdot |\phi_1/\phi| < |\phi_2/\phi_3|$$

$$1.05 \cdot |\phi_1/\phi| > |\phi_2/\phi_3|$$

$$1.0 < |\phi_+/\phi_-| < 1.2$$

$$0.8 \cdot \alpha < |\phi_2| < 1.1 \cdot \alpha$$

where $\phi_1$, $\phi_2$ and $\phi_3$ are the powers of said first to said third lens groups, respectively, $\phi$ is a power of the entire system, $\phi_+$ and $\phi_-$ are the powers of the positive and negative lenses constituting the lens pair in said third lens group, $e_{12}$ is an interval between principal points of said first and said second lens groups, and $$\alpha = \left| \frac{\phi_1}{e_{12} \cdot \phi_1 - 1} - \frac{1}{0.3/\phi - 1/\phi_1 - e_{12}} \right|$$

10. An apparatus for measuring the thickness of a film on a sample, said apparatus comprising:
   means for illuminating a sample; and
   a microscopic optical system for imaging ultraviolet and/or far ultraviolet light from said sample, said microscopic optical system including an objective lens system for converging said light in an image formation direction, said objective lens system including:
   a first lens made of either quartz or fluorite, said first lens having a positive power;
   a second and a third lenses made of quartz, both of said second and said third lenses having a negative power; and
   a fourth lens made of fluorite, said fourth lens having a positive power,
   wherein said first to said fourth lenses are disposed in that order from an object side to an image formation side with predetermined air spacings therebetween,
   and wherein the following inequalities are satisfied:

$$0.54 < |\phi_1/\phi_2| < 0.75$$

$$0.90 < |\phi_4/\phi_3| < 0.95$$

where $\phi_1$, $\phi_2$, $\phi_3$ and $\phi_4$ are the powers of said first to said fourth lenses, respectively.

11. An apparatus for measuring the thickness of a film on a sample, said apparatus comprising:
   means for illuminating a sample; and
   a microscopic optical system for imaging ultraviolet and/or far ultraviolet light from said sample, said microscopic optical system including an objective lens system for converging said light in an image formation direction, said objective lens system including:
   a first lens being a meniscus lens made of either quartz or fluorite, said first lens having a positive power, said first lens having a convex surface directed toward an object;
   a second lens made of quartz, said second lens having a negative power; and
   a third lens made of fluorite, said third lens having a positive power,
   wherein said first to said third lenses are disposed in that order from an object side to an image formation side with predetermined air spacings therebetween,
   and wherein the following inequalities are satisfied:

$$1.1 < |\phi_3/\phi_2| < 1.3$$

$$0.90 |\phi_{1-}/\phi| < |\phi_{1-}/\phi_{23}|$$

$$100 |\phi_{1-}/\phi| > |\phi_{1-}/\phi_{23}|$$

$$0.80 \cdot |(4\phi/3\phi_{1+} - 1)/\phi_{1+}| < |1/\phi_{1-}|$$

$$1.1 \cdot |(4\phi/3\phi_{1+} - 1)/\phi_{1+}| > |1/\phi_{1-}|$$

where $\phi_1$, $\phi_2$ and $\phi_3$ are the powers of said first to said third lenses, respectively, $\phi_{23}$ is a power of a composite lens system consisting of said second and said third lenses, $\phi$ is a power of the entire system, and $$\phi_{1+} = (n-1)/r_1$$

$$\phi_{1-} = (1-n)/r_2$$

where
   n: refractive index of said first lens
   $r_1$: radius of curvature of a surface of said first lens which is directed to the object side
   $r_2$: radius of curvature of a surface of said first lens which is directed to the image side.

12. An apparatus for measuring the thickness of a film on a sample, said apparatus comprising:
   means for illuminating a sample; and
   a microscopic optical system for imaging ultraviolet and/or far ultraviolet light from said sample, said microscopic optical system including an objective lens system for converging said light in an image formation direction, said objective lens system including:
   a first lens group including a lens made of either quartz or fluorite, said lens having a positive power; a second lens group including a lens made of quartz, said lens having a negative power; and a third lens group including a lens pair, said lens pair comprising a lens having a positive power and a lens having a negative power, said positive lens made of fluorite, said negative lens made of quartz, said positive and negative lenses being separated from each other,
   wherein said first to said third lens groups are disposed in that order from an object side to an image formation side with predetermined air spacings therebetween, and
   wherein said objective lens system satisfies:

$$0.95 \cdot |\phi_1/\phi| < |\phi_2/\phi_3|$$

$$1.05 \cdot |\phi_1/\phi| > |\phi_2/\phi_3|$$

$$1.0 < |\phi_+/\phi_-| < 1.2$$

$$0.8 \cdot \alpha < |\phi_2| < 1.1 \cdot \alpha$$

where $\phi_1$, $\phi_2$ and $\phi_3$ are the powers of said first to said third lens groups, respectively, $\phi$ is a power of the entire system, $\phi_+$ and $\phi_-$ are the powers of the positive and negative lenses constituting the lens pair in said third lens group, $e_{12}$ is an interval between principal points of said first and said second lens groups, and $$\alpha = \left| \frac{\phi_1}{e_{12} \cdot \phi_1 - 1} - \frac{1}{0.3/\phi - 1/\phi_1 - e_{12}} \right|$$

* * * * *